United States Patent
Pauwels et al.

(10) Patent No.: US 6,174,084 B1
(45) Date of Patent: Jan. 16, 2001

(54) LINEAR MOTION BEARING ASSEMBLY WITH LOAD COMPENSATION

(75) Inventors: William A. Pauwels, Franklin Lakes, NJ (US); Gregory S. Lyon, Mamaroneck, NY (US)

(73) Assignee: Thomson Industries, Inc., Port Washington, NY (US)

(*) Notice: Under 35 U.S.C. 154(b), the term of this patent shall be extended for 0 days.

(21) Appl. No.: 09/393,476

(22) Filed: Sep. 10, 1999

(51) Int. Cl.[7] .............................. F16C 29/06; F16C 23/00
(52) U.S. Cl. .................................. 384/8; 384/43; 384/45; 384/57
(58) Field of Search .............................. 384/8, 9, 43, 44, 384/45, 49, 57

(56) References Cited

U.S. PATENT DOCUMENTS

| | | | |
|---|---|---|---|
| 4,648,725 | * 3/1987 | Takahashi | 384/9 |
| 4,953,988 | * 9/1990 | Tsukada | 384/8 |
| 5,201,584 | * 4/1993 | Simons | 384/49 |
| 5,328,269 | * 7/1994 | Mutolo et al. | 384/57 |
| 5,346,313 | * 9/1994 | Ng | 384/43 |
| 5,431,498 | * 7/1995 | Lyon | 384/45 |
| 5,484,210 | * 1/1996 | Gallone | 384/57 X |
| 5,558,442 | * 9/1996 | Ng | 384/43 |
| 5,613,780 | * 3/1997 | Ng | 384/43 |
| 5,800,065 | * 9/1998 | Lyon | 384/45 |

\* cited by examiner

*Primary Examiner*—Thomas R. Hannon
(74) *Attorney, Agent, or Firm*—Dilworth & Barrese

(57) ABSTRACT

A linear motion bearing assembly is provided including a carriage, a rail, and a bearing assembly. The linear motion bearing assembly includes deflectable structure formed in at least one of the carriage, rail and bearing assembly. The deflectable structure is configured to deflect under a predetermined force to affect load bearing characteristics of the linear motion bearing assembly. Pressure transducer structure is disposed adjacent to and configured for engaging the deflectable structure to apply the predetermined force to affect load bearing characteristics. The deflectable structure may include portions of the rail defining a cavity. The pressure transducer structure is disposed within the cavity. In another embodiment, the carriage includes a sidewall depending therefrom whereby the deflectable structure includes the sidewall. In yet another embodiment, the bearing assembly includes a ball retainer having a load bearing plate aperture. The deflectable structure includes a load bearing plate positioned within the aperture. The pressure transducer structure may include piezoelectric structure.

33 Claims, 18 Drawing Sheets

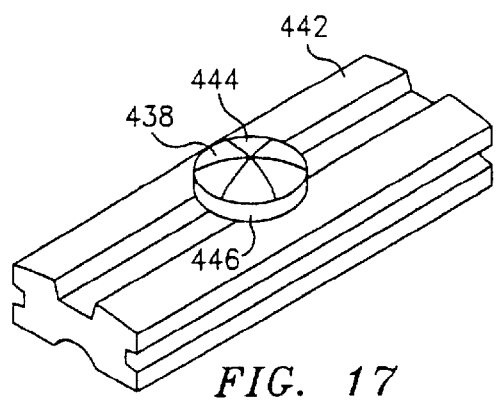
FIG. 17
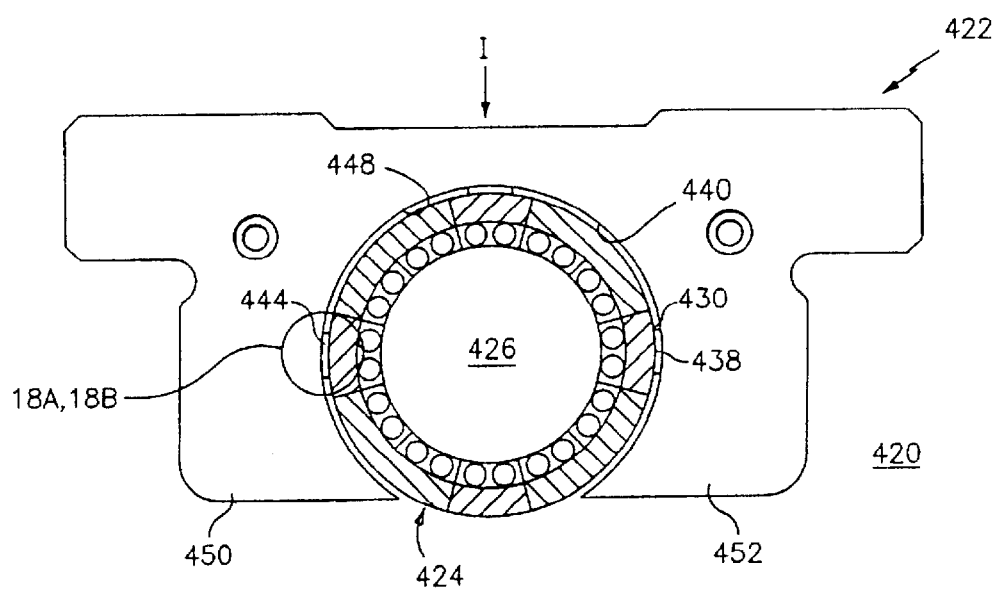
FIG. 18
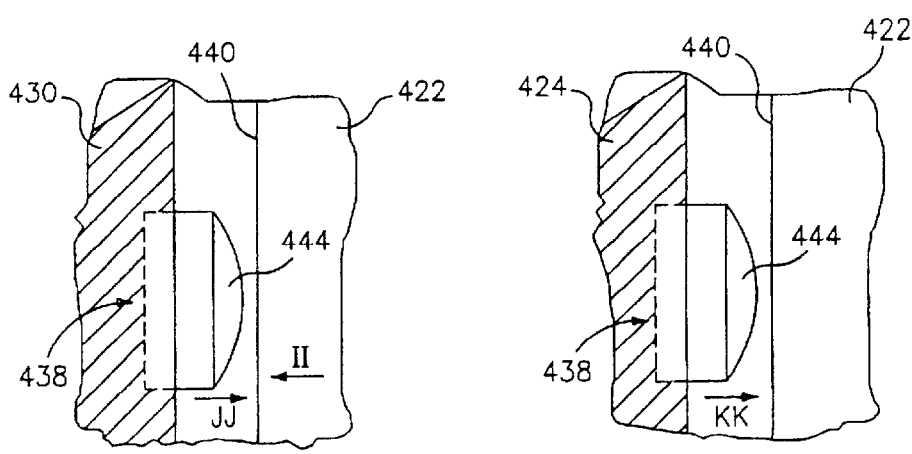
FIG. 18A
FIG. 18B

LINEAR MOTION BEARING ASSEMBLY WITH LOAD COMPENSATION

BACKGROUND

1. Field of the Invention

The present invention relates to anti-friction linear motion bearing assemblies and, more particularly, to linear motion bearing assemblies configured to affect load bearing characteristics of the assembly.

2. Description of the Related Art

The present invention is directed to improvements in linear motion bearing assemblies. In particular, the improvements relate to linear motion bearing assemblies of the type whereby a bearing carriage or pillowblock houses a linear bearing assembly for linear movement along a support member, such as, for example, an elongated shaft, rail or spline. The inside bore of the carriage or pillowblock houses the linear bearing.

These linear bearing assemblies are used extensively in a wide variety of machines, machine tools, transfer systems and other equipment where machine elements move with respect to one another. These assemblies, typically, include a bearing carriage mounted for movement along a modified Y-beam, I-beam or T-beam shaped rail. See, for example, U.S. Pat. No. 5,431,498 to Lyon, the disclosure of which is hereby incorporated by reference. Other prior art bearing assemblies are contemplated which include a bearing carriage and a ball retainer dimensioned for insertion into the bearing carriage. See, for example, U.S. Pat. No. 5,613,780 to Ng, the disclosure of which is hereby incorporated by reference.

The load bearing capacity and life of an anti-friction bearing system is dependent on factors such as radial clearance and tolerance between the rolling elements and races, operating loads and environment, type of carriage and carriage materials, bearing size and type, bearing lubrication, and machine operating speeds. Typically, a constant low coefficient of friction of a predetermined magnitude is required in those applications where a load can cause the linear motion bearing assembly to skid which impairs rolling performance.

Accordingly, compensating for a load with load deflection, preloading, etc., provides a constant low coefficient of friction, increases rigidity, and, therefore, the guidance accuracy of the bearing assemblies. However, excessive load compensation can cause uneven or overloading of the rolling elements which may result in pitting, spalling or cracking at the bearing surface of the rolling elements, causing premature bearing failure. Therefore, an optimum load compensation is required to enhance bearing service life and performance characteristics, such as accuracy of travel along the shaft and deflection characteristics.

A known method of applying load compensation to a linear bearing assembly is to machine the races of the bearing to very close tolerances to provide a controlled clearance ("precision fit"). This method results in relatively high costs in terms of labor and equipment.

Another conventional method is providing an open type bearing carriage with an adjusting screw which allows the user to manually adjust preload on the bearing. As the screw is manipulated, the inside bore diameter of the carriage deforms to reduce the clearance between the shaft and the bearing creating pressure between the bearing and the shaft. Typically, a plurality of adjusting screws are positioned between the outer races of the bearing and systematically tightened to approach a uniform friction loading over the diameter/length of the bearing. This method is difficult to implement since the screws must be adjusted in an even manner to uniformly alter the resulting pressure on the rolling elements. Additionally, the adjusting screws are subject to loosening due to machine-generated shock and vibration. Permanent strain can occur preventing any further adjustment.

Moreover, in cases where the external load does not overcome the preset preload, unless preset preload is adjusted on the bearing, a greater dynamic friction force is placed on the bearing. The life of the bearing will be compromised. Therefore, in order to optimize smoothness and longevity, the adjusting screws must be adjusted every time load is changed.

Other devices are known for applying load compensation to a linear bearing assembly. U.S. Pat. No. 5,201,584 discloses a linear bearing slide assembly having a longitudinal spring that applies a compressive force against a preloading bar to the slide for providing a preload.

U.S. Pat. No. 5,328,269 discloses an anti-friction bearing preloaded by a hydraulically or pneumatically generated force applied to the exterior of a bearing carriage.

These conventional methods of load compensation are time consuming, labor intensive and require a high degree of precision. The result is inefficiency in achieving economical production of anti-friction bearings having predetermined load bearing characteristics.

Thus, it would be highly desirable to provide a linear bearing assembly that easily and efficiently provides load compensation. Furthermore, it is contemplated that such an assembly controls load deflection characteristics of the assembly through a pressure transducer structure that measures bearing load during operation and maintains optimum load deflection characteristics of the assembly.

Accordingly, it is one object of the present invention to provide a linear motion bearing assembly which is easily and efficiently manufactured to increase the useful life of the linear motion bearing assembly.

It is another object of the present invention to provide a linear motion bearing assembly that controls load deflection characteristics with pressure transducer structure configured to engage deflectable structure of the assembly.

SUMMARY

In accordance with the present invention, a linear motion bearing assembly is provided which is easily and efficiently manufactured to increase the useful life of the assembly. The assembly can control load deflection characteristics with pressure transducer structure configured to engage deflectable structure of the assembly.

In one embodiment, a linear motion bearing assembly is provided that has a carriage, a rail, and a bearing assembly. The linear motion bearing assembly includes deflectable structure formed in at least one of the carriage, rail and bearing assembly. The deflectable structure is configured to deflect under a predetermined force to affect the load bearing characteristics of the linear motion bearing assembly. Pressure transducer structure is disposed adjacent to and configured for engaging the deflectable structure to apply the predetermined force on the deflectable structure in response to external stimuli. The pressure transducer structure may be operated by a computerized numerical controller.

The pressure transducer structure may include piezoelectric structure. The piezoelectric structure may include at least one piezoelectric chip. The piezoelectric structure may also include two piezoelectric chips. One of the chips is configured to sense the external stimuli and a second of the chips is configured to apply the predetermined force on the deflectable structure.

The deflectable structure may include portions of the rail that define a cavity along a longitudinal length of the rail. The pressure transducer structure is disposed within the cavity. The deflectable structure may include portions of the rail that include a pair of walls that define the cavity therebetween. The pressure transducer structure is disposed on one of the walls within the cavity and the pressure transducer structure is engageable with the remaining wall. In an alternate embodiment, the deflectable structure includes only one of the walls.

In another embodiment, the deflectable structure may include portions of the rail that include horizontal arms. Each of the arms define at least one groove along the longitudinal length of the rail. The groove defines at least a portion of a load bearing track.

The carriage may include a sidewall depending therefrom. The deflectable structure comprises the sidewall. In another embodiment, the carriage includes a pair of depending legs. The deflectable structure comprises at least one of the legs. At least one of the legs defines a cavity. At least a portion of the pressure transducer structure is disposed within the cavity. Alternatively, each of the legs may include a cavity.

In another embodiment, the carriage may define a groove along a longitudinal length thereof. The deflectable structure is disposed within the groove. The carriage also defines at least one cavity having pressure transducer structure configured to apply the predetermined force to the deflectable structure. The deflectable structure may include a longitudinally extending wedge. The wedge has longitudinally extending inserts disposed thereon and are configured to engage the rail. Alternatively, the carriage may define abutment structure along a longitudinal length thereof. The deflectable structure includes longitudinally extending inserts disposed to engage the abutment structure.

In another alternate embodiment, the bearing assembly includes a ball retainer having an outer portion. The outer portion defines a load bearing plate aperture. The deflectable structure includes a load bearing plate positioned in the load bearing plate aperture. The pressure transducer structure is disposed on the load bearing plate. The carriage may define a plurality of cavities. Each cavity has pressure transducer structure disposed therein for applying the predetermined force to the deflectable structure. The cavities may also be configured to threadably receive preload structure configured to apply at least a portion of the predetermined forces to the deflectable structure.

In another embodiment, the linear motion bearing assembly includes a carriage and a bearing assembly. The assembly has an elongated rail having opposing sides. Each of the opposing sides includes a pair of horizontal arms. Each of the arms has an inner surface and an outer surface. The inner surface defines a cavity between the arms. The outer surface defines a pair of substantially parallel grooves. The grooves defines a portion of load bearing tracks. The arms are configured to deflect under a predetermined force to affect load bearing characteristics of the linear motion bearing assembly. A plurality of piezoelectric chips are disposed within each of the cavities and configured for engaging the respective inner surfaces to apply the predetermined force on the arms in response to external stimuli.

In another embodiment, a machine table assembly is provided that includes a machine table supported by a pair of linear motion bearing assemblies. The machine table assembly includes deflectable structure including at least a portion of the machine table. The deflectable structure is configured to deflect under a predetermined force to affect load bearing characteristics of the machine table assembly. Pressure transducer structure is disposed on at least one of the linear motion bearing assemblies and adjacent to and configured for engaging said deflectable structure to apply said predetermined force on the deflectable structure in response to external stimuli. Each of the linear motion bearing assemblies may include a carriage having a top portion and a side portion. The pressure transducer structure may include a vertical piezoelectric stack disposed within a cavity defined within the top portion and a horizontal stack disposed within a cavity defined within the side portion. The machine table assembly may further include a displacement sensor and a load sensor. The sensors are configured to cooperate with a reference bar to orient the machine table relative to the linear motion bearing assemblies.

BRIEF DESCRIPTION OF DRAWINGS

FIG. 17 is a perspective view of a load bearing plate shown in FIG. 16;

FIG. 18 is an end view of a linear motion bearing assembly including the bearing assembly shown in FIG. 16;

FIG. 18A is an enlarged detail view of one embodiment of pressure transducer structure shown FIG. 18;

FIG. 18B is an enlarged detail view of an alternate embodiment of pressure transducer structure shown in FIG. 18;

DETAILED DESCRIPTION OF EXEMPLARY EMBODIMENTS

Figure 1:
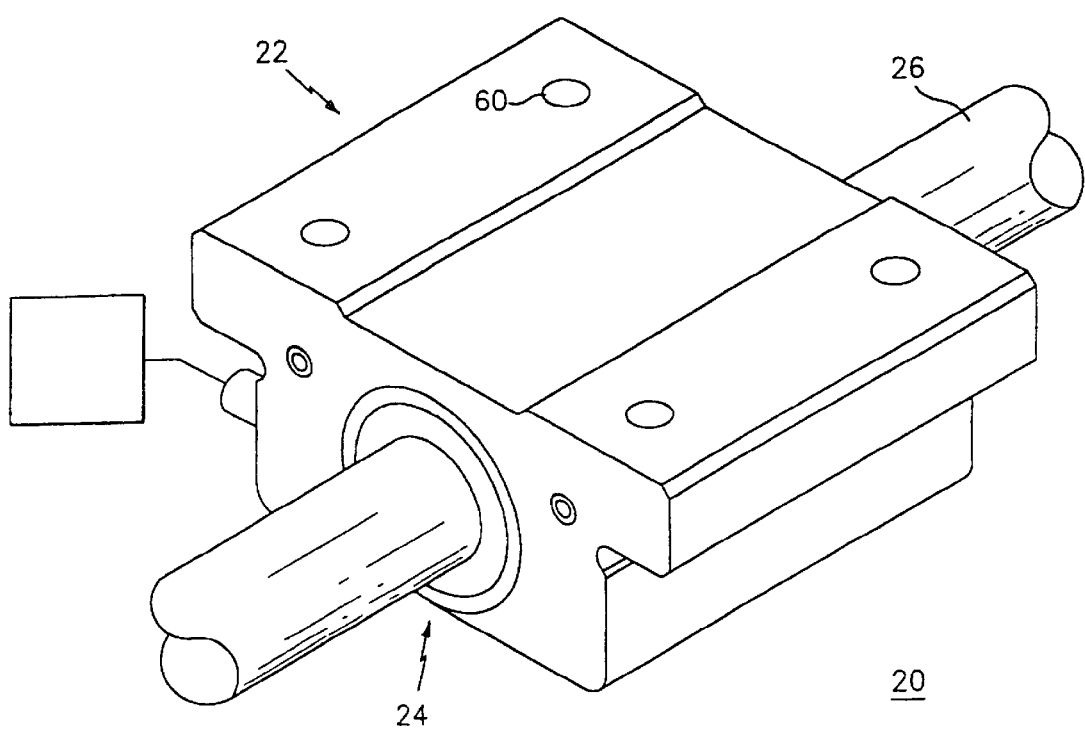
FIG. 1 is a perspective view of one embodiment of a linear motion bearing assembly in accordance with the present invention.

Referring now to the drawings in detail, wherein like reference numerals identify similar structural elements of the subject invention, there is illustrated linear motion bearing assemblies including deflectable structure configured to deform under a predetermined force to affect load bearing characteristics of the assembly.

Referring initially to FIG. 1, a linear motion bearing assembly, designated generally by the numeral 20, in accordance with the present invention, is shown. Linear motion bearing assembly 20 includes an open type bearing carriage 22 configured and dimensioned for receipt of a bearing assembly 24 for movement along a rail 26. The deflectable structure includes the bearing assembly, as will be discussed hereinbelow.

Pressure transducer structure is disposed adjacent to and configured for engaging the deflectable structure to apply a predetermined force on the deflectable structure in response to external stimuli. The external stimuli may include externally applied loads, such as, for example, compressive loads, shear loads, tensile loads, etc. External stimuli may also include factors, such as, for example, radial clearance and tolerance between the rolling elements and races, operating environments, bearing lubrication and machine operating speeds.

Figure 2:
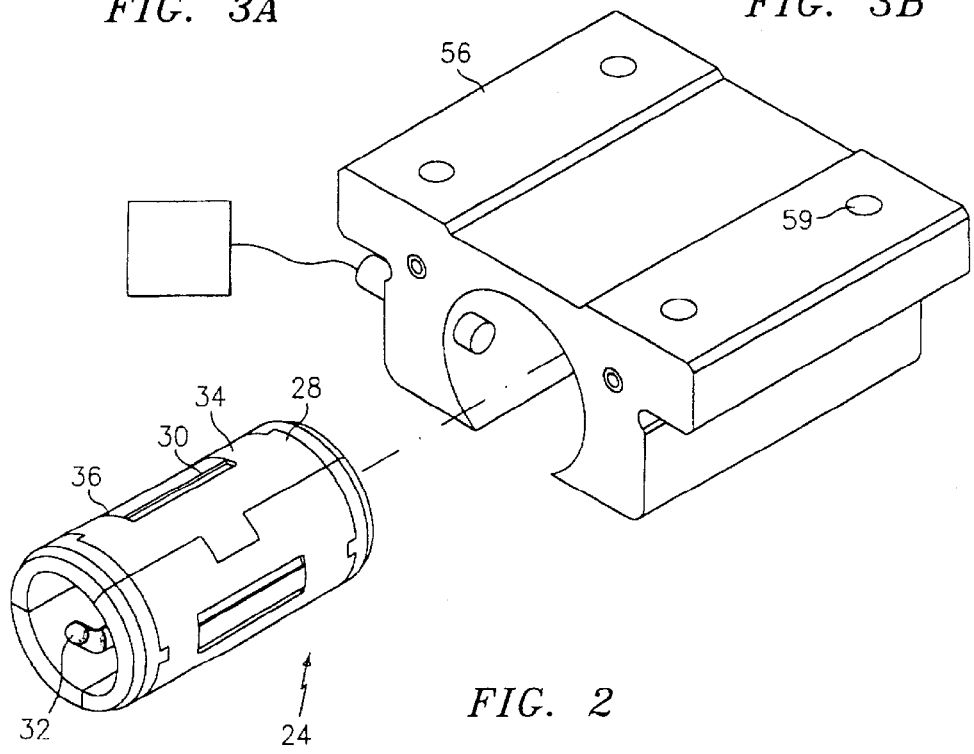
FIG. 2 is a perspective view of the embodiment shown in FIG. 1 with the ball retainer separated from the bearing carriage.

Referring to FIG. 2, bearing assembly 24 includes a ball retainer 28, load bearing plates 30 and rolling elements 32. It is contemplated that rolling elements 32 may be formed of high strength materials suitable for bearing applications. The components of the bearing assembly described are manufactured and assembled according to the knowledge of one skilled in the art. Other bearing assemblies known to one skilled in the art may be used that provide the requisite flexibility so that deflectable structure may be formed in the bearing assembly, in accordance with the present disclosure. See, for example, U.S. Pat. No. 5,613,780 to Ng, U.S. Pat. No. 5,558,442 to Ng, U.S. Pat. No. 5,431,498 to Lyon and U.S. Pat. No. 5,346,313 to Ng.

Ball retainer 28 has an outer portion 34. Outer portion 34 defines load bearing plate apertures 36. The deflectable structure includes load bearing plate 30 positioned in load bearing plate aperture 36. Load bearing plate 30 is assembled within load bearing plate aperture 36 providing bearing assembly 24 with a deflectable structure which is advantageously configured to deflect under a predetermined force to affect load bearing characteristics of linear motion bearing assembly 20. Bearing assembly 24, due to its deflectable configuration, facilitates load compensation according to external stimuli. It is also contemplated that ball retainer 28 may comprise the deflectable structure configured to deflect within bearing carriage 22 and affect load bearing characteristics.

Figure 3:
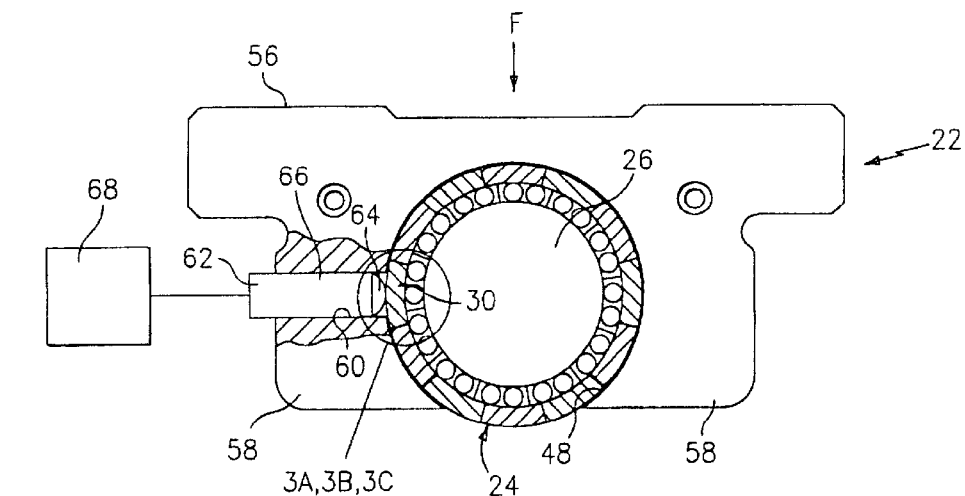
FIG. 3 is an end view, in partial cross-section, of the embodiment shown in FIG. 1.

Referring to FIG. 3, an axial bore 48 of bearing carriage 22 is configured for receipt of bearing assembly 24 therewithin. Bearing carriage 22 has a load supporting portion 56 and a pair of depending legs 58 extending therefrom. Bearing carriage 22 is formed from machine grade material, such as, for example, aluminum, plastic or steel. Bearing carriage 22 may be coated for corrosion resistance, such as, for example, by anodizing, galvanizing, etc. Mounting holes 59 (FIG. 2) are formed in an upper planar surface of load supporting portion 56 of bearing carriage 22 and facilitate engagement to desired machinery components. Components of bearing carriage 22 are manufactured according to the knowledge of one skilled in the art. Other bearing carriages known to one skilled in the art may used that provide the requisite flexibility for bearing applications in accordance with the present invention. See, for example, U.S. Pat. Nos. 5,800,065 and 5,431,498 to Lyon.

Bearing carriage 22 defines a cavity 60 in depending leg 58 for receipt of pressure transducer structure, such as, for example, piezoelectric stack 62. It is envisioned that a plurality of cavities may be defined in either or both depending legs for receipt of pressure transducer structure to facilitate load compensation. It is further contemplated that a plurality of pressure transducer structure may be disposed in each cavity. Piezoelectric stack 62 is configured for engaging load bearing plate 30 of bearing assembly 24 to apply a predetermined force, as will be discussed below, to bearing assembly 24 in response to an external stimuli. It is envisioned that the piezoelectric stack may engage various portions of outer portion 34 of ball retainer 28. Piezoelectric stack 62 is expanded and contracted with electric potential. Thus, load compensation may be controlled through electronic means.

Piezoelectric stack 62 is disposed within cavity 60 for engagement with bearing assembly 24 and is fixed therein by means known to one skilled in the art, such as, for example, adhesive, frictional receipt, etc. It is contemplated that piezoelectric stack 62 may be removable from cavity 60.

Figure 3A:
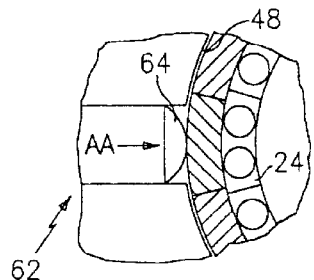
FIG. 3A is an enlarged detail view of one embodiment of pressure transducer structure shown in FIG. 3.

Piezoelectric stack 62 includes an engagement portion 64, as shown in FIG. 3A, having a substantially spherical configuration for conforming to outer portion 34 of ball retainer 28. Engagement portion 64 can be expanded or contracted in engagement with the deflectable structure of assembly 20 to apply a predetermined force in response to external stimuli. The spherical configuration of engagement portion 64 advantageously engages the deflectable structure, bearing assembly 24, in a uniform manner, providing an even load compensation, e.g., load deflection, damping, etc. This facilitates improved accuracy of travel along rail 26. It is contemplated that engagement portion 64 may have other suitable configurations, such as, for example, rectangular, tetrahedronal, etc., for proper engagement with a bearing assembly disposed within a linear motion bearing assembly.

Each piezoelectric stack 62 includes a piezoelectric element (not shown). The piezoelectric element is included within a body portion 66 of the stack as a transduction element. Referring to FIG. 3, a variable power source 68 supplies voltage to the piezoelectric element. The piezoelectric element translates the signal into a pressure which is applied to bearing assembly 24 from engagement portion 64 of the stack.

An application of an external stimuli, such as, for example, an external load F, in the direction of the arrow shown, is applied to bearing carriage 22. Load F is secured to bearing carriage 22 and bearing carriage portion 56 via mounting holes 59. Load F is transmitted through carriage 22, load bearing plate 30 and rolling elements 32 to shaft 26. Transmission of load F causes an alteration of the load bearing characteristics of assembly 20. In response thereto, power source 68 energizes the piezoelectric element included within piezoelectric stack 62 providing load compensation through engagement with bearing assembly 24, as discussed above.

As shown in FIG. 3A, as downward load F is applied to linear motion bearing assembly 20, the inner surface of axial bore 48 engages bearing assembly 24. Bearing assembly 24 is caused to engage engagement portion 64 of piezoelectric stack 62.

Piezoelectric stack 62 provides load compensation through expanding engagement with bearing assembly 24, shown by arrow AA. Applying a predetermined force from piezoelectric stack 62 facilitates load deflection of linear motion bearing assembly 20, facilitating load compensation for load F. The load compensation provided by piezoelectric stack 62 allows for correct compliance and orientation of bearing assembly 24 within bearing carriage 22 about shaft 26 thereby affecting load bearing characteristics of assembly 20. It is contemplated that load F may be reduced and piezoelectric stack 62 contracts in response thereto.

Figure 3B:
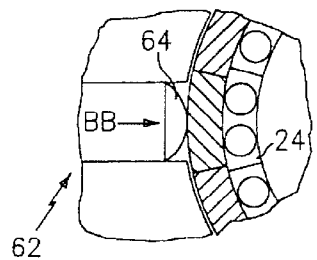
FIG. 3B is an enlarged detail view of an alternate embodiment of pressure transducer structure shown in FIG. 3.

In an alternate embodiment, as shown in FIG. 3B, prior to the application of load F, piezoelectric stack 62 is expanded to preset preload. Engagement portion 64 of stack 62 engages bearing assembly 24. Portion 64 engages bearing assembly 24, as shown by arrow BB, to properly orient and provide compliance for the anticipated load. It is contemplated that the piezoelectric stack may be contracted for a preset preload.

The preset preload facilitated by piezoelectric stack 62 provides a load compensation for a load to achieve optimum deflection characteristics of linear motion bearing assembly 20 improving accuracy of travel of carriage 22 along rail 26. For example, during fast traverses of carriage 22 along shaft 26, the preload is relaxed. Conversely, during a slower traverse, such as, for example, a cutting operation, preload, is increased and piezoelectric stack 62 expands into engagement with bearing assembly 24. The preset preload by piezoelectric stack 62 and the resultant divergence or convergence of legs 58 may be instantaneously changed due to the advantageous control of load compensation through electronic means, such as, for example, power source 68 (FIG. 3).

Figure 3C:
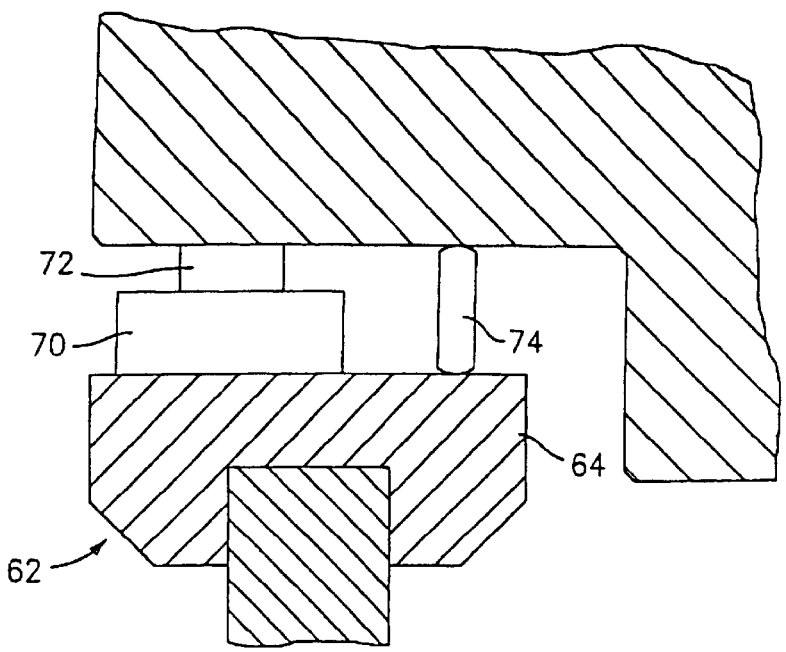
FIG. 3C is an enlarged detail view of another alternate embodiment of pressure transducer structure shown in FIG. 3.

In another alternate embodiment, as shown in FIG. 3C, piezoelectric stack 62 is a pressure transducer that performs measurements, as well as load compensation, of the load bearing characteristics of assembly 20. Engagement portion 64 includes an active transducer 70, a load sensor 72 and a displacement sensor 74. The measurements taken are directly compared to a reference standard using an algorithm for determining load compensation.

Figure 4:
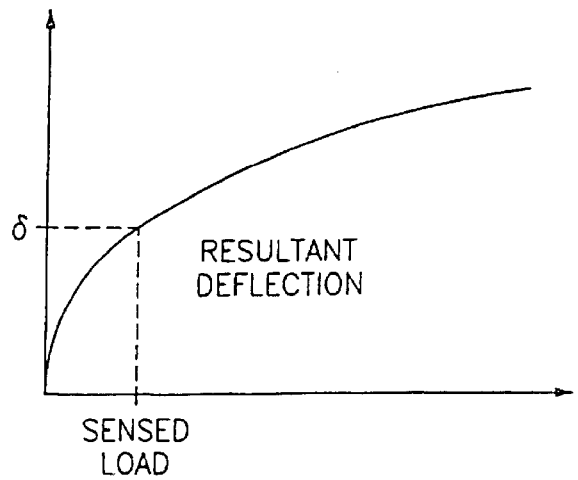
FIG. 4 is a graphical representation of the deflection of a linear motion bearing assembly according to load F shown in FIG. 3.
Figure 5:
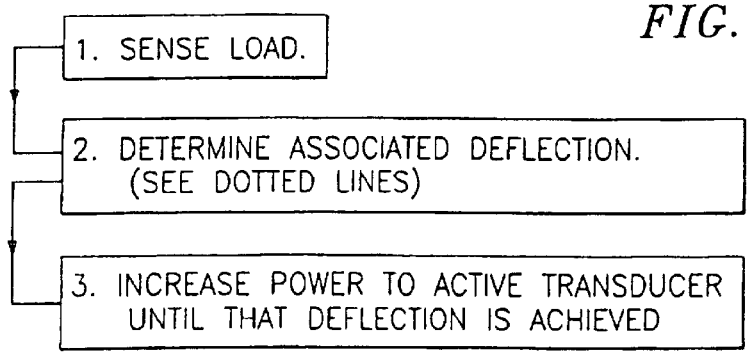
FIG. 5 is a block diagram illustrating an algorithm employed by the pressure transducer structure shown in FIGS. 3C and 4.

Referring to FIG. 4, a graphical representation illustrates the resultant deflection $\delta$, according to the particular load F (FIG. 3) measured by load sensor 72. In response thereto, active transducer 70 provides load compensation to assembly 20 to facilitate correct compliance and orientation of bearing assembly 24 therewithin until $\delta$ is reached. As shown in FIG. 5, an algorithm is used to determine load compensation for the particular load F and corresponding $\Delta e$. According to the algorithm, power source 68 delivers the electric signal and correspondingly increases power until $\Delta e$ is reached. Load deflection characteristics may be preset for assembly 20 according to a particular linear bearing application.

Figure 6:
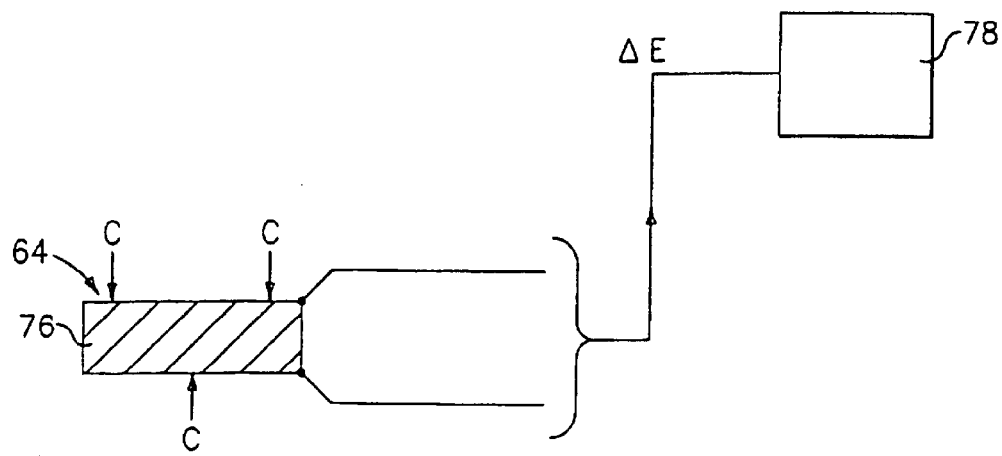
FIG. 6 is a schematic diagram of pressure transducer structure in an electrical circuit with a computerized numerical controller in the sensing mode.

Referring to FIG. 6, during sensing of load and deflection, the deformation or deflection of bearing assembly 24 causes a stress, shown by arrows C, on a piezoelectric crystal 76 included within piezoelectric stack 74, due to load F on assembly 20. The stress applied to crystal 76 causes the crystal to generate an output signal, $\Delta E$. Output signal $\Delta E$ corresponding to external stimuli is outputted to a system controller, such as, for example, a computerized numerical controller 78. It is envisioned that during sensing of a load, piezoelectric stack 74 is electrically connected in series with controller 78. It is contemplated that other system controllers may be used such as, for example, a programmable logic control. Controller 78 includes any suitable digital computer or microprocessor having the appropriate preprogrammed electronics and software required for operation thereof, as is known in the art. The particular electronic elements utilized can be readily assembled and operated by one skilled in the art in light of the description provided herein, therefore, further detail explanation of the specific electronics and programming is not provided herein.

Figure 7:
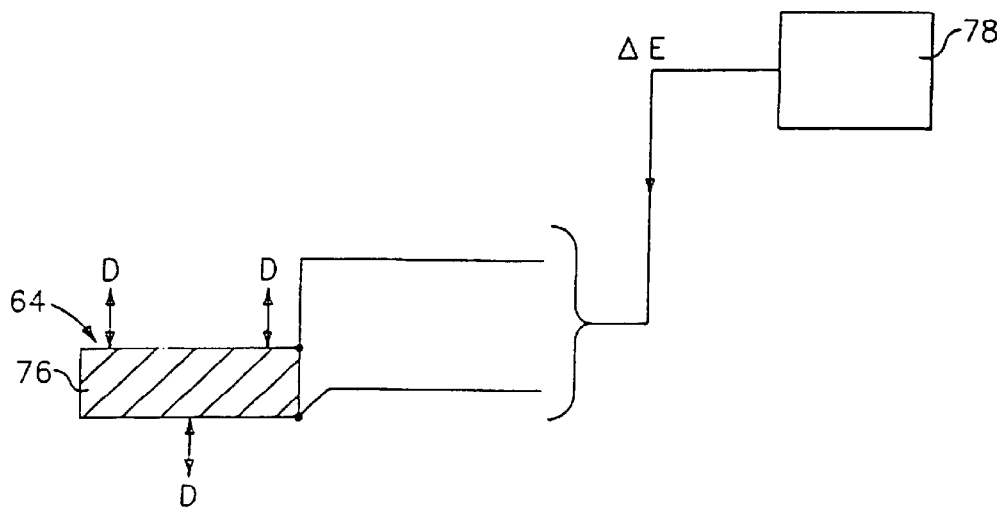
FIG. 7 is a schematic diagram of the circuit shown in FIG. 6 in the load compensation mode.

Controller 68 compares signal $\Delta E$ to a preset range of values based on a particular bearing application, as discussed with regard to FIGS. 4 and 5. Referring to FIG. 7, in response to signal $\Delta E$, a voltage is applied to crystal 76 causing expansion or relaxation of engagement portion 64, shown by arrows D, and corresponding engagement with bearing assembly 24, facilitating load compensation to affect load bearing characteristics of assembly 20. A voltage may be applied to crystal 76 to affect load bearing characteristics prior to operation of assembly 20 for application of a preset preload for a particular load. Crystal 76 may include natural or synthetic crystals. Crystal materials may include quartz and ceramic fixtures, such as, for example, titanates, niohates, zirconates and magnetostrictive. It is contemplated that of the plurality of chips disposed on the deflectable structure, some individual chips may be dedicated to sensing external stimuli and other chips may be dedicated to facilitating load compensation.

Figure 8:
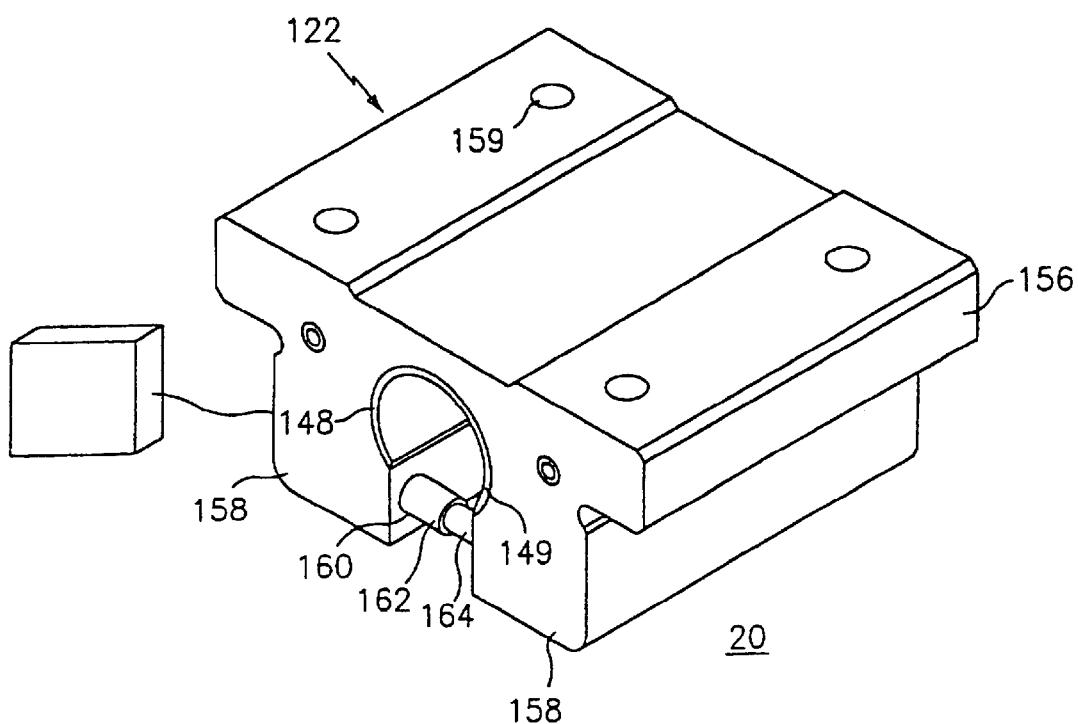
FIG. 8 is a perspective view of an alternate embodiment of an open bearing carriage in accordance with the present invention.
Figure 9:
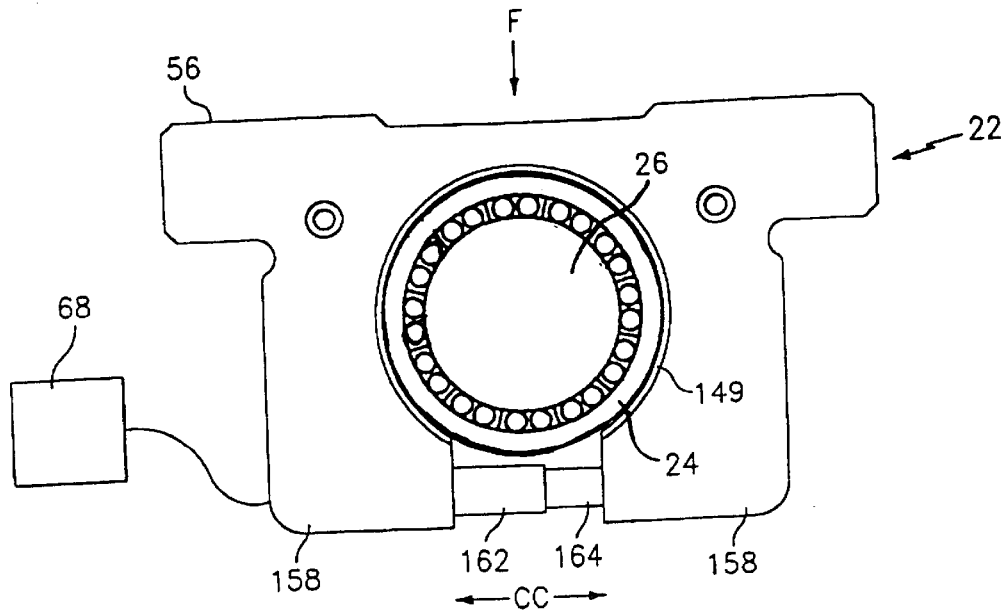
FIG. 9 is an end view in partial cross-section of the embodiment shown in FIG. 8 expanded for receipt of a bearing assembly and rail.
Figure 10:
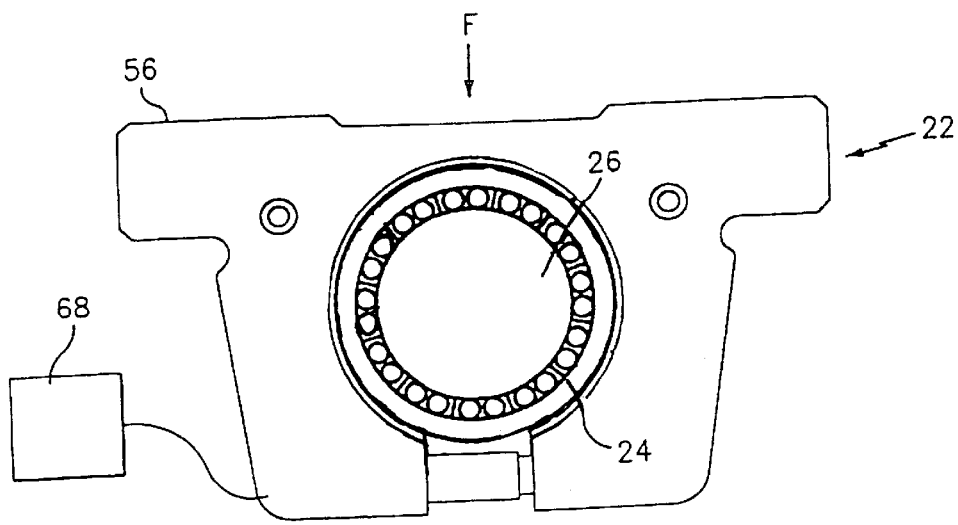
FIG. 10 is the end view shown in FIG. 9 with preload applied.

Referring to FIGS. 8–10, an alternate embodiment of linear bearing assembly 20, in accordance with the present invention, is shown. Linear motion bearing assembly 20 includes an open type bearing carriage 122 configured and dimensioned for receipt of bearing assembly 24 for movement along rail 26. The deflectable structure includes the bearing carriage, as will be discussed hereinbelow. Bearing carriage 122 advantageously converges on bearing assembly 24 to preset preload prior to application of external stimuli. Pressure transducer structure included within bearing carriage 122 provides a load compensation for an external stimuli to achieve optimum deflection characteristics of linear motion bearing assembly 20.

As shown in FIG. 8, an axial bore 148 of bearing carriage 122 is configured for receipt of bearing assembly 24 therewithin. An axial band 149, is included within axial bore 148 for engagement with the bearing assembly. Band 149 advantageously facilitates support of the bearing assembly. Bearing carriage 122 has a bearing carriage portion 156 and a pair of depending legs 158 extending therefrom.

Bearing carriage 122 defines a cavity 160 in depending leg 158 for receipt of a piezoelectric stack 162. Piezoelectric stack 162 is configured for engaging the opposing depending leg 158 to apply a predetermined force, and change preload for affecting load bearing characteristics of assembly 20. Piezoelectric stack 162 includes an engagement portion 164 which can be expanded or contracted into engagement with the opposing depending leg 158 of bearing carriage 122 for adjusting preload on bearing assembly 24.

Prior to receipt of bearing assembly 24 for movement along rail 26, depending legs 158 of bearing carriage 122 are in a converging condition so that the maximum preload is being applied. Referring to FIG. 9, prior to the application of external stimuli, piezoelectric stack 162 is expanded so that engagement portion 164 engages the opposing depending leg 158 causing depending legs 158 to diverge, as shown by arrows CC. Depending legs 158 diverge so that bearing assembly 24 may be received within axial bore 148. Piezoelectric stack 162 is contracted causing engagement portion 164 to retract from opposing depending leg 158. Upon retraction of engagement portion 164, axial band 149 in cooperation with bore 148, converge about bearing assembly 24 for supporting the bearing assembly therein. Contraction of piezoelectric stack 162 causes a preset preload to be applied to bearing assembly 24 and rail 26. The preset preload facilitated by piezoelectric stack 162 provides a load compensation for an external stimuli to achieve optimum deflection characteristics of linear motion bearing assembly 20 improving accuracy of travel of carriage 122 along rail 26. The preset preload applied may be altered using piezoelectric stack 162 according to the external stimuli applied to assembly 20.

Figure 11:
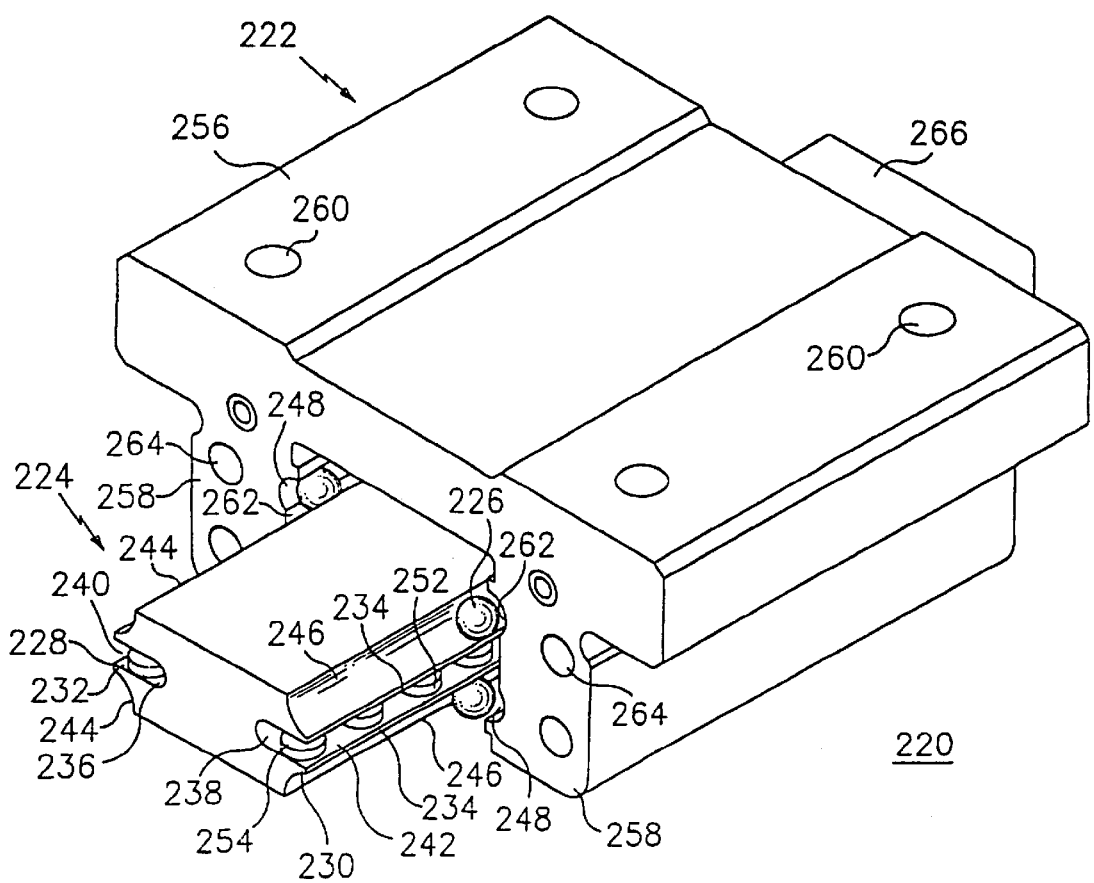
FIG. 11 is a perspective view of another alternate embodiment of a linear motion bearing assembly in accordance with the present invention.

Referring to FIG. 11, another alternate embodiment of a linear motion bearing assembly in accordance with the present invention is shown. A linear motion bearing assembly 220 includes a inverted substantially U-shaped bearing carriage 222 configured and dimensioned to move along a rail 224 on rolling elements 226. Deflectable structure is formed in rail 224, as will be discussed hereinbelow.

Rail 224 is formed of a relatively flexible machine grade material, such as, for example, aluminum, plastic or steel. Rail 224 may be formed by cold drawing processes and subsequently cut to a desired length, or extruded using known production techniques. It is envisioned that rail 224 may be treated for corrosion resistance such as, for example, by anodizing, galvanizing, etc. Alternatively, rail 224 may be die cast from suitably flexible metals or molded from suitably flexible engineering plastics, such as, for example, polyacetals, polycarbonates, polyamides, etc. One skilled in the art, however, will realize that other materials and fabrication methods that provide a degree of deflection desirable for a desired load compensation, in accordance with the present invention, also would be appropriate. It is contemplated that engineering plastics used may incorporate metal stiffeners in order to provide sufficient rigidity, as well as deflection, for a particular linear motion bearing application.

Rail 224 has opposing sides 228 and 230 formed along a longitudinal length in an outer surface thereof. It is envisioned that rail 224 may have various configurations, such as, circular, rectangular, elliptical, etc. Each of opposing sides 228 and 230, include a pair of walls defining a cavity therebetween, such as, for example, horizontal arms 232 and 234. Horizontal arms 232 and 234 have a substantially tapered cross-section. It is envisioned, however, that arms 232 and 234 may have a substantially uniform thickness.

Horizontal arms 232 and 234 are monolithically formed with rail 224. Horizontal arms 232 and 234 and, correspondingly, the cavities defined therebetween may be of varied depth depending on the degree of flexure required and the associated manufacturing costs constraints of a particular bearing application. It is contemplated that arms 232 and 234 may be integrally connected to rail 224 as an assembly of individual components.

Horizontal arms 232 define inner surface 236 and horizontal arms 234 define inner surface 238. The deflectable structure of assembly 220 includes portions of rail 224 which define cavities along a longitudinal length of rail 224, such as, for example, a cavity 240 defined by inner surface 236 and a cavity 242 defined by inner surface 238. It is contemplated that rail 24 may define a single cavity for flexibility.

Cavities 240 and 242 provide horizontal arms 232 and 234, respectively, with an advantageous degree of flexibility. The flexibility of arms 232 and 234 provide the portions of rail 224 with deflectable structure which is advantageously configured to deform under a predetermined force to affect load bearing characteristics of assembly 220, as will be discussed hereinbelow. Arms 232 and 234, due to their deflectable configuration, facilitate load compensation according to external stimuli.

Horizontal arms 232 and 234 include outer surfaces, respectively, the outer surfaces each defining a pair of substantially parallel grooves 244 and 246. Grooves 244 form a portion of load bearing tracks 248 corresponding to opposing side 228 of rail 224. Grooves 246 are defined within an outer surface of horizontal arms 234 and form a portion of load bearing tracks 248 corresponding to opposing side 230. Grooves 244 and 246 are configured and dimensioned in an appropriate cross sectional shape to conform to rolling elements 226 employed in linear motion bearing assembly 220. The grooves define bearing surfaces corresponding in a substantially parallel relationship to grooves and bearing surfaces defined within carriage 222 that make up a portion of load bearing tracks 248. It is contemplated that machined inserts (not shown) may be installed with the grooves to provide smooth, low-friction bearing surfaces for employment of balls 226.

The components of rail 224 described are manufactured according to the knowledge of one skilled in the art. Other rail assemblies known to one skilled in the art may be used that provide the requisite flexibility so that deflectable structure may be formed in the rail, in accordance with the present disclosure, see for example, U.S. Pat. No. 5,431,498 to Lyon.

A plurality of piezoelectric chips 252 are disposed within cavities 240 and 242. It is envisioned that pressure transducer structure may be disposed in only one cavity of rail 224. It is further contemplated that a single chip is disposed in a cavity. Piezoelectric chips 252 are configured for engaging inner surfaces 236 and 238 to apply a predetermined force, as will be discussed below, to horizontal arms 232 and 234 in response to an external stimuli. Piezoelectric chips 252 are expanded and contracted with electric potential, similar to that discussed above.

Plurality of piezoelectric chips 252 are disposed on one of said walls of rail 224, such as, for example, inner surface 236 of horizontal arms 232 within cavity 240 and are engageable with the opposing side of inner surface 236 to apply the predetermined force in response to the external stimuli. Similarly, piezoelectric chips 252 are disposed on inner surface 238 of horizontal arms 234 within cavity 242 and are engageable with the opposing side of inner surface 238 to apply the predetermined force. Piezoelectric chips 252 are mountable to inner surfaces 236 and 238 by an adhesive, mechanical, or welded connection in a manner known to one skilled in the art. Inner surfaces 236 and 238 may have a smooth or rough texture depending on the mounting means used and the constraints of the particular bearing application.

Figure 12:
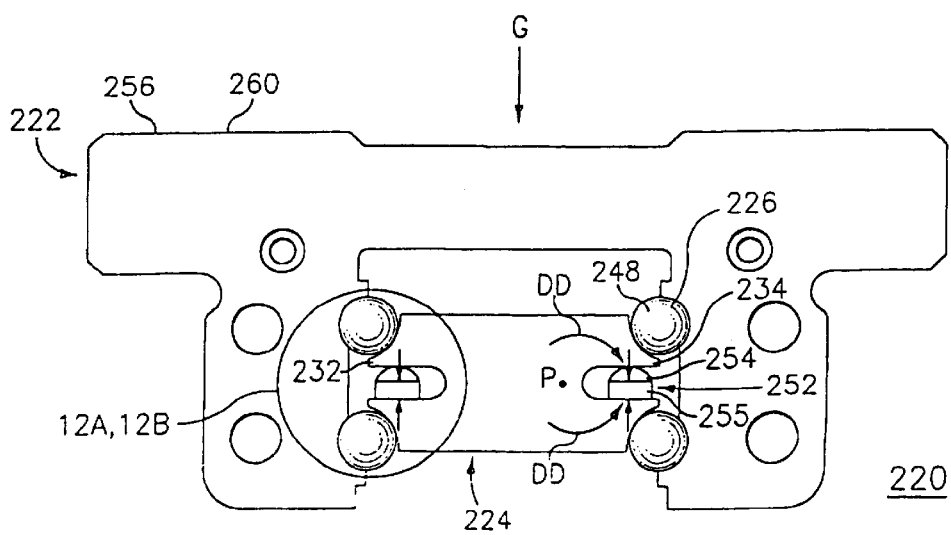
FIG. 12 is an end view of the embodiment shown in FIG. 11.

Referring to FIG. 12, each of piezoelectric chips 252 includes an engagement portion 254. Engagement portion 254 has a substantially semi-spherical configuration. Engagement portion 254 can be expanded or contracted in engagement with the deflectable structure of assembly 220 to apply a predetermined force in response to external stimuli. The semi-spherical configuration of engagement portion 254 advantageously engages the deflectable structure, arms 232 and 234, in a uniform manner, providing an even load compensation, e.g., load deflection. This facilitates improved accuracy of travel along rail 224. It is contemplated that engagement portion 254 may have other suitable configurations such as, for example, planar, conical, tetrahedronal, etc. Engagement portion 254 engages inner surfaces 236 and 238 of arms 232 and 234, respectively, to advantageously provide load compensation to assembly 220. Load compensation may include load deflection, preloading, etc.

Piezoelectric chips 252 are pressure transducers that perform measurements of load bearing characteristics of assembly 220. The measurements taken are directly compared to a reference standard, similar to the algorithm discussed with regard to FIGS. 4 and 5. It is contemplated that each piezoelectric chip 252 performs a sensing function, similar to the piezoelectric element discussed with regard to FIGS. 3C–7.

Referring back to FIG. 11, bearing carriage 222 is configured for receipt of rail 224 and rolling elements 226 for linear translation therewithin. Bearing carriage 222 has a bearing carriage portion 256 and a pair of depending legs 258 extending therefrom. Mounting holes 260 are formed in an upper planar surface of carriage portion 256 of bearing carriage 222 and facilitate engagement to desired machinery components.

Bearing carriage 222 defines parallel grooves 262 on an inner surface thereof. Parallel grooves 262 make up a portion of load bearing tracks 248 and are configured and dimensioned in an appropriate cross sectional shape to conform to rolling elements 226 employed in bearing assembly 220. The grooves define bearing surfaces corresponding in a substantially parallel relationship to grooves 244 and 246 defined within rail 224 that make up a portion of load bearing tracks 248. It is contemplated that machined inserts (not shown) may be installed with the grooves to provide smooth, low-friction bearing surfaces for employment of balls 226.

Carriage 222 includes return tracks 264 located in depending legs 258. Return tracks 264 are configured and dimensioned in an appropriate cross sectional shape to conform to rolling elements 226. End caps 266 are positioned on each longitudinal end (shown only on the longitudinal rear end of FIG. 11) of bearing carriage 222. End caps 266 serve to enclose and connect corresponding load bearing and return tracks 248 and 264, respectively, as is within the knowledge of one skilled in the art (see, e.g., Lyon U.S. Pat. No. 5,431,498). The components of bearing carriage 222 are manufactured according to the knowledge of one skilled in the art.

Referring now to FIG. 12, an application of an external stimuli, such as, for example, an external load G, in the direction of the arrow shown, is applied to bearing carriage 222. Load G is secured to bearing carriage 220 at bearing carriage portion 256 via mounting holes 260. Load G is transmitted through carriage 222, load bearing tracks 248, and rolling elements 226 to rail 224. As downward load G is applied to bearing carriage 222 and load is transmitted to rolling elements 226, horizontal arms 232 and 234 deflect and deform in response thereto.

Figures 12A, 12B:
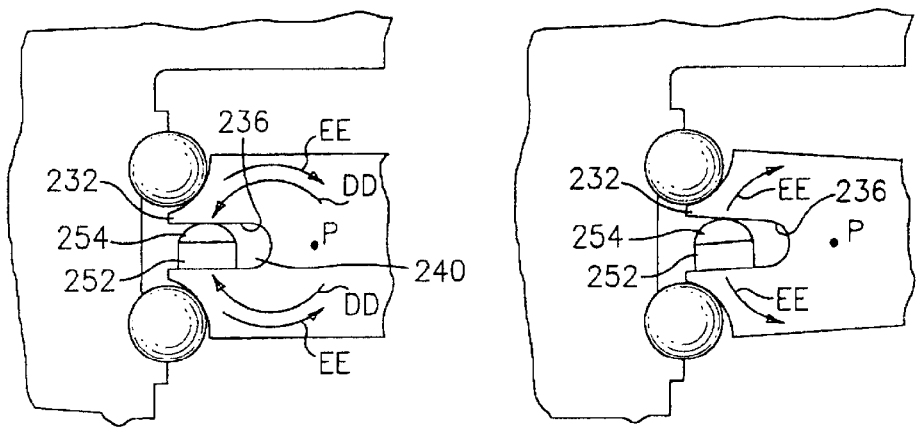
FIG. 12A an enlarged detail view of one embodiment of pressure transducer structure shown in FIG. 12.
FIG. 12B is an enlarged detail view of an alternate embodiment of the pressure transducer structure shown in FIG. 12.

Horizontal arms 232 and 234 are caused to converge respectively, as shown by arrows DD about a point P. As shown in FIG. 12A, as downward load G is applied, inner surface 236 of horizontal arms 232 engages engagement portion 254 of piezoelectric chips 252 disposed within cavity 240. Engagement portion 254 senses deflection of the arms from load G and corresponding deflection similar to that discussed with regard to FIGS. 3C–7 herein. Horizontal arms 234 similarly function.

In response to load G and the deflection of arms 232 and 234 caused thereby, piezoelectric chips 252 provide load deflection through expanding engagement with inner surfaces 236 and 238, as shown by arrows EE in FIG. 12A, facilitating load compensation for load G on assembly 220. It is contemplated that load G may be reduced, causing a negative external stimuli, whereby engagement portion 254 is relaxed and the respective arms are caused to diverge. In that situation, chip 252 contracts from arms 232 and 234, shown by arrows DD in FIG. 12A, while providing load compensation. The load compensation provided by piezoelectric chips 252 allows for correct compliance and orientation of arms 232 and 234 thereby affecting load bearing characteristics of assembly 220. Piezoelectric chips 252, by providing a pressure type engagement with inner surfaces 236 and 238, provide a constant low coefficient of friction and improve guidance accuracy to enhance bearing service life and load bearing characteristics.

In an alternate embodiment, as shown in FIG. 12B, prior to the application of load G (FIG. 12), piezoelectric chips 252 are expanded or contracted to preset preload. Engagement portion 254 of chip 252 engages inner surface 236 of arms 232. Horizontal arms 232 are caused to diverge, as shown by arrows EE about point P. It is contemplated that the piezoelectric chip may be relaxed for a preset preload causing the respective arms to converge. The preset preload facilitated by piezoelectric chip 252 provides a load compensation for a load to achieve optimum deflection characteristics of linear motion bearing assembly 220, improving accuracy of travel of carriage 222 along rail 224. The preset preload facilitated by piezoelectric chips 252 and the resultant divergence or convergence of arms 232, 234 may be instantaneously changed due to the advantageous control of load compensation through electronic means, such as, for example, controller 68, shown in FIGS. 6 and 7.

Figure 13:
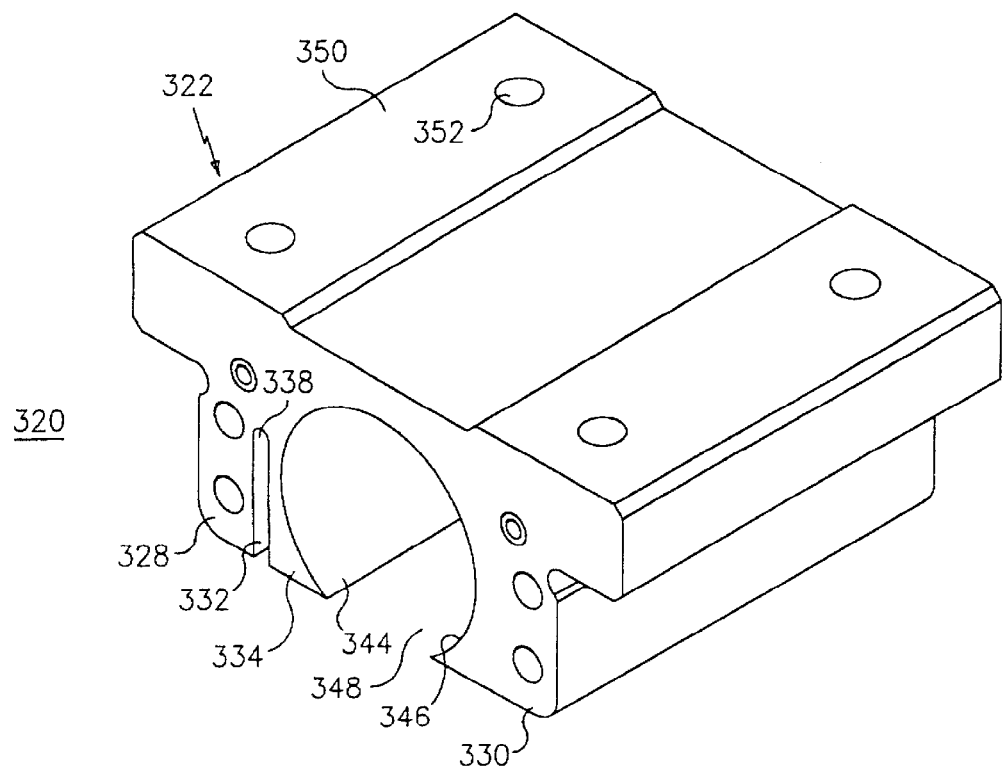
FIG. 13 is a perspective view in an alternate embodiment of a bearing carriage in accordance with the present invention.
Figure 14:
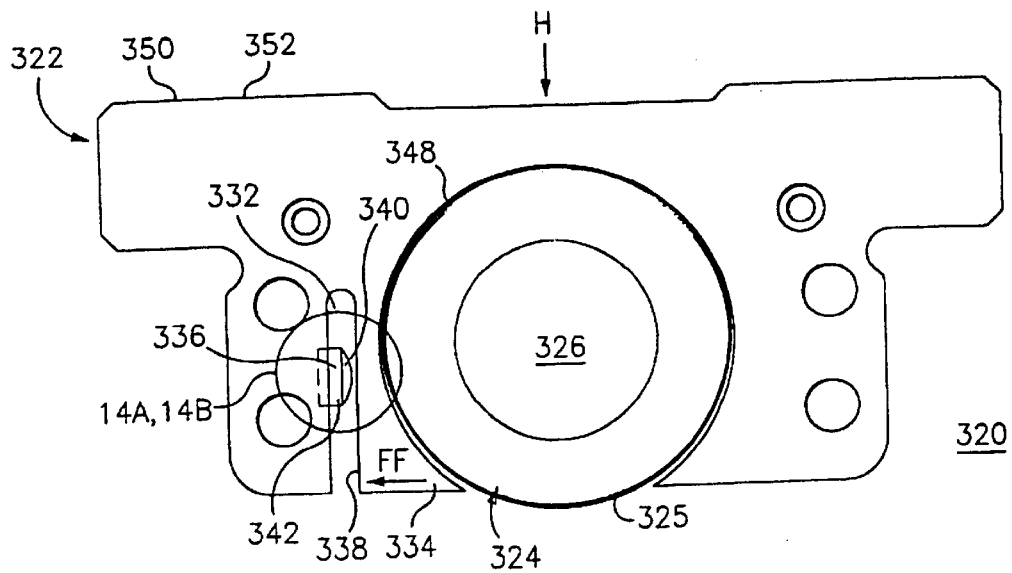
FIG. 14 is an end view of the embodiment shown in FIG. 13 with a bearing assembly and rail.

Referring to FIGS. 13 and 14, an alternate embodiment of a linear motion bearing assembly in accordance with the present invention is shown. A linear motion bearing assembly 320 includes an open type bearing carriage 322 configured and dimensioned for receipt of a bearing assembly 324 for movement along a rail 326. Deflectable structure is formed in bearing carriage 322 and is configured to deform under a predetermined force to affect load bearing characteristics of assembly 320.

Referring to FIG. 13, bearing carriage 322 includes a pair of side walls, such as, for example, depending legs 328 and 330. Legs 328 and 330 are substantially tapered in thickness. It is contemplated, however, that the thickness of legs 328 and 330 may be either uniform or nonuniform to modify the deflection characteristics of bearing carriage 322.

The deflectable structure of bearing carriage 322 includes a side wall depending therefrom, such as, for example, depending leg 328. Depending leg 328 defines a cavity 332. As will be discussed, at least a portion of the pressure transducer structure is disposed within cavity 332. Depending leg 328 includes a deflectable side wall 334 adjacent cavity 332.

Cavity 332 provides depending leg 328 with an advantageous degree of flexibility. The flexibility of depending leg 328 facilitated by cavity 332 provides bearing carriage 322 with deflectable structure configured to deform under a predetermined force to affect load bearing characteristics of assembly 320, as will be discussed hereinbelow. Depending leg 328, due to its deflectable configuration, facilitates load compensation according to external stimuli.

Referring to FIG. 14, a plurality of piezoelectric chips 336 are disposed within cavity 332. Piezoelectric chips 336 are configured for engaging an inner surface 338 of depending leg 328, which defines cavity 332, to apply a predetermined force to deflectable side wall 334 in response to an external stimuli. It is envisioned that a single chip is disposed in cavity 332.

Piezoelectric chips 336 are disposed on inner surface 338 of depending leg 328 within cavity 332 and are engageable with an opposing side of inner surface 338 to apply the predetermined force. Piezoelectric chips 336 are mountable to inner surface 338 by an adhesive, mechanical, or welded connection in a manner known to one skilled in the art.

Piezoelectric chips 336, similar to the embodiment described with regard to FIGS. 11–12B, have an engagement portion 340 and a body portion 342. Engagement portion 340 can be expanded into or contracted from a deflectable structure of assembly 320 to apply the predetermined force. Engagement portion 340 of each piezoelectric chip 336 engages inner surface 338 of depending leg 328 to advantageously provide load compensation to assembly 320. Piezoelectric chips 336 perform measurements of the load bearing characteristics of assembly 320 that are directly compared to preset characteristics according to a particular linear bearing application. Operation of piezoelectric chips 336 is similar to that described with regard to FIGS. 11–12B.

Referring back to FIG. 13, legs 328 and 330 have opposing inner surfaces 344 and 346, respectively. Inner surfaces 344 and 346 define an axial bore 348. Axial bore 348 is substantially cylindrical and configured for receipt of a bearing assembly. It is contemplated that axial bore 348 may be geometrically configured in various orientations according to the particular geometrical configuration of the bearing assembly to be received, such as, for example, rectangular, elliptical, etc. As shown in FIG. 14, axial bore 348 is configured for receipt of a bearing assembly, such as, for example, ball retainer 325. The components of ball retainer 325 are manufactured and assembled according to the knowledge of one skilled in the art.

Bearing carriage 322 has a bearing carriage portion 350 from which depending legs 328 and 330 extend. Mounting holes 352 are formed in an upper planar surface of carriage portion 350 of bearing carriage 322 and facilitate engagement to desired machinery components.

An application of an external load H, in a direction of the arrow shown, is applied to bearing carriage 322. Load H is secured to bearing carriage 322 at bearing carriage portion 350 via mounting holes 352. Load H is transmitted through bearing carriage 322 and bearing assembly 324 to rail 326. As downward load H is applied to bearing carriage 322 and transmitted to rail 326, legs 328 and 330 are caused to converge on bearing assembly 324. Deflectable side wall 334 deflects in a direction of arrow FF upon engagement with bearing assembly 324.

Figure 14A:
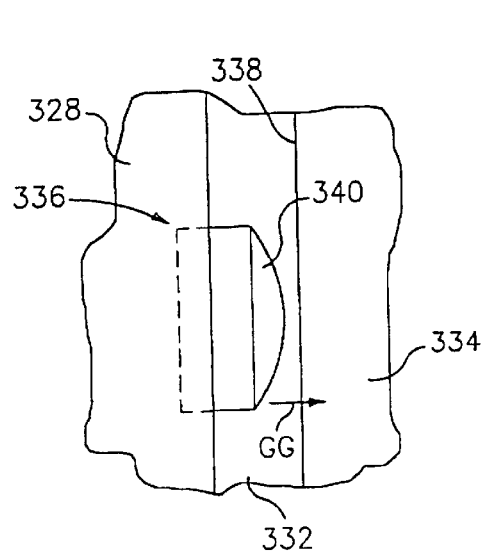
FIG. 14A is an enlarged detail view of one embodiment of pressure transducer structure shown in FIG. 14.

Referring to FIG. 14A, as downward load H is applied, and deflectable side wall 334 deflects into cavity 332, inner surface 338 engages engagement portion 340 of piezoelectric chips 336 which are disposed within cavity 332. Engagement portion 340 senses deflection of deflectable side wall 334 corresponding to load H, similar to that discussed with regard to FIGS. 3C–7.

In response to load H and the deflection of deflectable side wall 334 caused thereby, piezoelectric chips 336 provide load deflection through expanding engagement with inner surface 338, as shown by arrow GG, facilitating optimum load compensation for load H on assembly 320. Load H may be reduced, causing negative external stimuli, whereby engagement portion 340 is relaxed and the side wall is caused to relax pressure on bearing assembly 324. The load compensation provided by piezoelectric chips 336 allows for correct compliance and orientation of depending leg 328 thereby affecting load bearing characteristics of assembly 320 and providing a constant low coefficient of friction and improving guidance accuracy on the assembly.

Figure 14B:
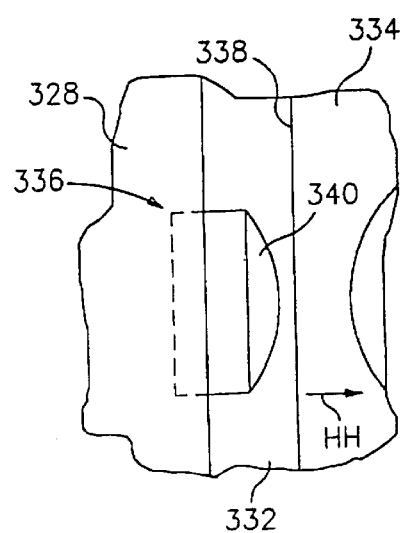
FIG. 14B is an enlarged detail view of an alternate embodiment of pressure transducer structure shown in FIG. 14.

In another alternate embodiment, as shown in FIG. 14B, prior to the application of load H, piezoelectric chips 336 are expanded or relaxed to preset preload. Engagement portion 340 of piezoelectric chips 336 engages inner surface 338 of depending leg 328. Deflectable side wall 334 is caused to converge, as shown by arrow HH, on bearing assembly 324. Piezoelectric chips 336 may be contracted for an optimum preset preload causing deflectable side wall 334 to diverge from bearing assembly 324. The preset preload facilitated by piezoelectric chips 336 provides a load compensation for a load to achieve optimum deflection characteristics of linear motion bearing assembly 320, improving accuracy of travel of bearing carriage 322 along rail 326. The preset preload facilitated by piezoelectric chips 336 and the resultant divergence or convergence of deflectable side wall 334 may be instantaneously changed due to the advantageous control of load compensation through electronic means, such as, for example, the computer numerical controller discussed above.

Figure 15:
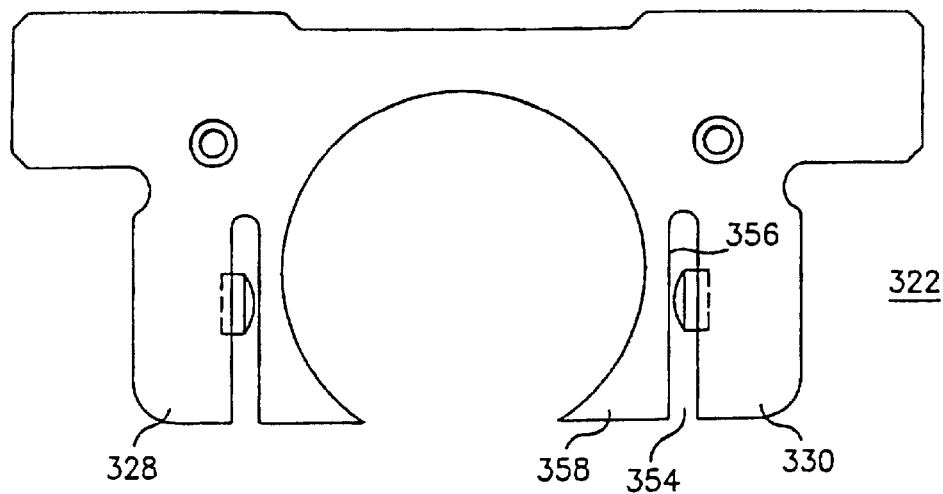
FIG. 15 is an end view of an alternate embodiment of the bearing carriage shown in FIG. 13.

In an alternate embodiment, as shown in FIG. 15, the deflectable structure of bearing carriage 322 includes depending leg 330, similar to the embodiment described with regard to FIGS. 13–14B. Depending leg 330 of bearing carriage 322 defines a cavity 354. Piezoelectric chips 336 are disposed within cavity 354. Depending leg 330 has an advantageous degree of flexibility facilitated by cavity 354 which provides bearing carriage 322 with deflectable structure configured to deform under a predetermined force to affect load bearing characteristics of assembly 320. An inner surface 356 engages piezoelectric chips 336. Depending leg 330 includes a deflectable side wall 358 adjacent cavity 354 which is configured for engagement with a bearing assembly, as discussed above. Depending leg 330, due to its deflectable configuration, facilitates load compensation according to external stimuli.

Referring to FIGS. 16–18B, another alternate embodiment of a linear motion bearing assembly in accordance with the present invention is shown. A linear motion bearing assembly 420 includes an open type bearing carriage 422 configured and dimensioned for receipt of a bearing assembly 424 for movement along a rail 426. Deflectable structure is formed in the bearing assembly, as will be discussed hereinbelow.

Figure 16:
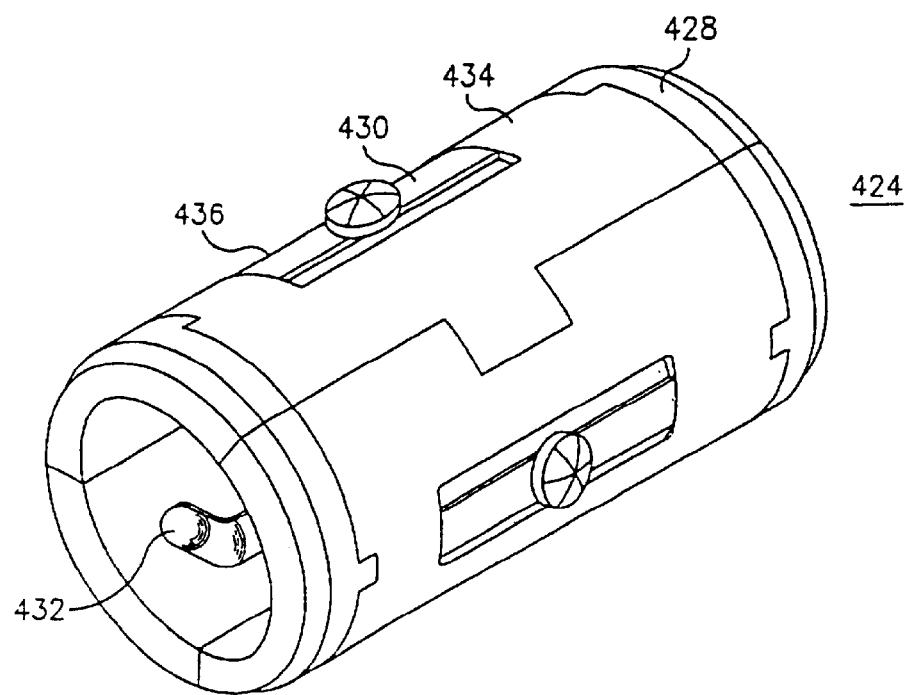
FIG. 16 is a perspective view of an alternate embodiment of a bearing assembly in accordance with the present invention.

Referring to FIG. 16, bearing assembly 424 includes a ball retainer 428, a load bearing plate 430 and rolling elements 432. Ball retainer 428 has an outer portion 434. Outer portion 434 defines a load bearing plate aperture 436. The deflectable structure of bearing assembly 424 includes load bearing plate 430 positioned in load bearing plate aperture 436. The pressure transducer structure, as will be discussed below, is disposed on load bearing plate 430.

Load bearing plate 430 is assembled within load bearing plate aperture 436 providing bearing assembly 424 with deflectable structure which is advantageously configured to deform under a predetermined force to affect load bearing characteristics of linear motion bearing assembly 420. Bearing assembly 424, due to its deflectable configuration, facilitates load compensation according to external stimuli.

Referring to FIG. 17, a piezoelectric chip 438 is disposed on each load bearing plate 430. It is contemplated that the piezoelectric chips may be disposed on only one load bearing plate or a multiple number of load bearing plates. It is further contemplated that more than one piezoelectric chip may be disposed on each load bearing plate, one piezoelectric chip being a sensing element and another piezoelectric chip providing a predetermined force to linear motion bearing assembly 420.

Referring to FIG. 18, piezoelectric chips 438 are configured for engaging an inner surface 440 of bearing carriage 422 and an outer surface 442 of load bearing plate 430 (FIG. 17) in response to external stimuli. Piezoelectric chips 438 are mountable to outer surface 442 by such as, for example, an adhesive, mechanical, or welded connection, in a manner known to one skilled in the art.

Piezoelectric chips 438 include an engagement portion 444 and a body portion 446. Piezoelectric chips 438 are configured and function, similar to the embodiments discussed above. Piezoelectric chip 438 advantageously engages the deflectable structure, load bearing plate 430, facilitating load compensation and thus improved accuracy of travel along rail 426.

An axial bore 448 of bearing carriage 422 is configured for receipt of bearing assembly 424 therewithin. An external stimuli, such as, for example, load I, in the direction of the arrow shown, is applied to bearing carriage 422. Load I is transmitted through carriage 422, load bearing plate 430 and rolling elements 432 to shaft 426. Depending legs 450 and 452 of bearing carriage 422 are caused to converge about bearing assembly 424. Shaft 426 engages rolling elements 432 causing load bearing plates 430 to deflect in response to load I. Inner surface 440 of axial bore 448 is caused to engage piezoelectric chips 438 disposed upon plates 430.

As shown in FIG. 18A, as downward load I is applied to linear motion bearing assembly 420, inner surface 440 of bearing carriage 422 engages engagement portion 444 of piezoelectric chip 438, as shown by arrow II. Engagement portion 444 senses deflection of load bearing plate 430 corresponding to load I.

In response to load I and the deflection of load bearing plate 430 caused thereby, piezoelectric chip 438 provides load compensation through expanding engagement with inner surface 440 of bearing carriage 422, shown by arrow JJ. Applying a predetermined force from piezoelectric chip 438 facilitates load deflection on linear motion bearing assembly 420, facilitating optimum load compensation for load I. The load compensation facilitated by piezoelectric chip 438 allows for correct compliance and orientation of bearing assembly 424 within bearing carriage 422 about shaft 426 thereby affecting load bearing characteristics of assembly 420. It is contemplated that load I may be reduced and piezoelectric chips 438 contracted in response thereto.

In an alternate embodiment, as shown in FIG. 18B, prior to the application of load I, piezoelectric chip 438 is expanded or relaxed to preset preload. Engagement portion 444 of chip 438 engages inner surface 440 of bearing carriage 422, as shown by arrow KK, to preset a preload on bearing assembly 424 and shaft 426.

Figure 19:
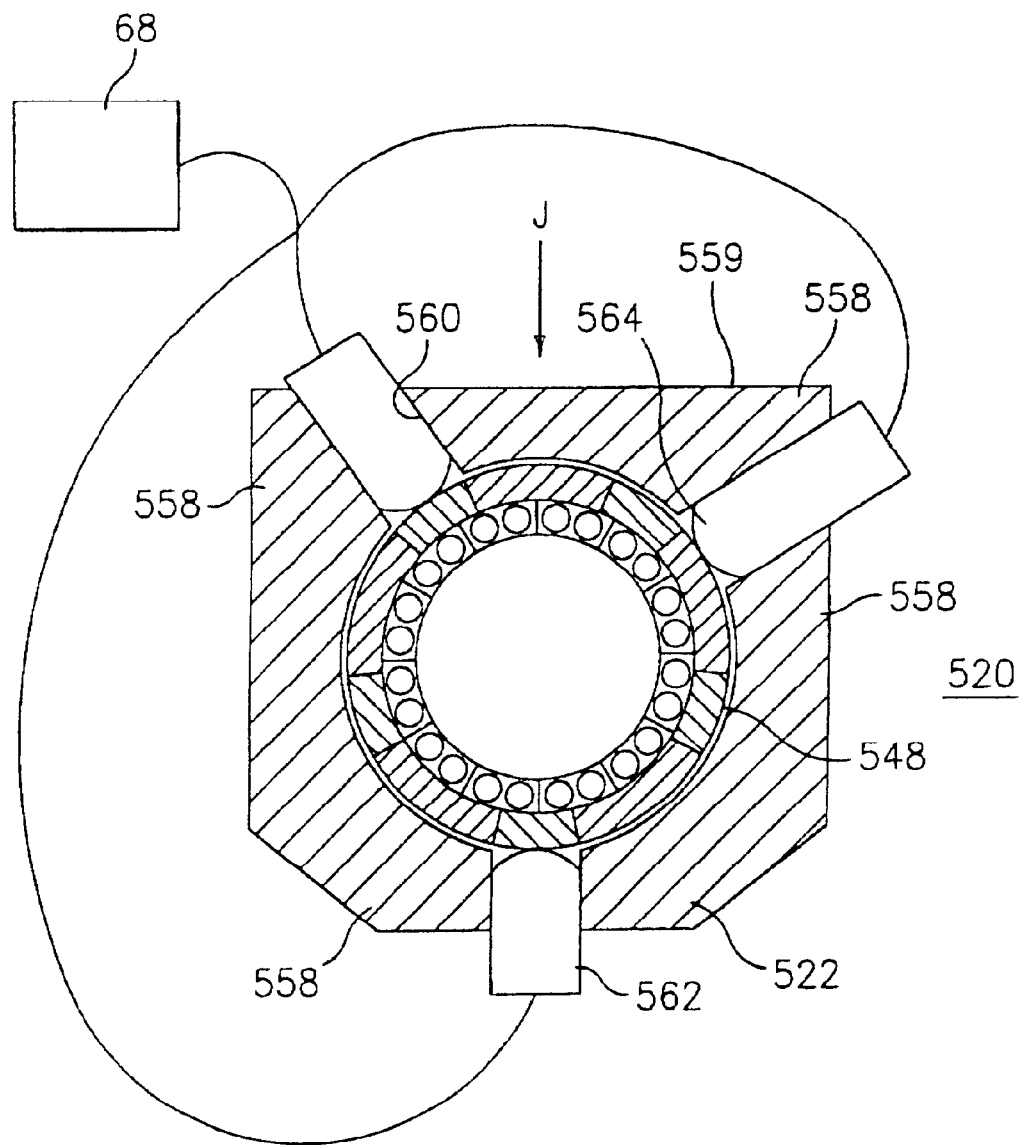
FIG. 19 is an end view, in partial cross-section, of an alternate embodiment of a linear motion bearing assembly in accordance with the present invention.

Referring to FIG. 19, another alternate embodiment of a linear motion bearing assembly, in accordance with the present invention is shown. A linear motion bearing assembly 520 includes a closed type bearing carriage 522 configured and dimensioned for receipt of a bearing assembly 24 for movement along a rail 26. The deflectable structure includes bearing assembly 24, similar to that discussed with regard to FIGS. 1–3.

Pressure transducer structure is disposed adjacent to and configured for engaging the deflectable structure providing load compensation and optimum positional orientation relative to bearing carriage 522. The pressure transducer structure applies a predetermined force on the deflectable structure in response to external stimuli. An axial bore 548 of bearing carriage 522 is configured for receipt of bearing assembly 24 therewithin.

Bearing carriage 522 includes sidewalls 558. Three of sidewalls 558 define cavities 560 for receipt of pressure transducer structure, such as, for example, piezoelectric stack 562. It is envisioned that a plurality of cavities may be defined in each sidewall or that various combinations of the sidewalls may include pressure transducer structure to facilitate load compensation. It is further contemplated that a plurality of pressure transducer structure may be disposed in each cavity. Piezoelectric stack 562 is configured for engaging load bearing assembly 24 to apply a predetermined force and provide positional orientation relative to bearing carriage 522, as will be discussed below, to bearing assembly 24 in response to an external stimuli. Piezoelectric stack 562 is expanded and contracted with electric potential. Load compensation and positional control may be controlled through an electronic means.

Piezoelectric stacks 562 are disposed within cavities 560, respectively, for engagement with bearing assembly 24.

Each piezoelectric stack 562 includes an engagement portion 564. Engagement portion 564 of each stack can be expanded or contracted into engagement with the deflectable structure of assembly 20 to apply a predetermined force in response to external stimuli. Piezoelectric stacks 562 are positioned about assembly 20 to facilitate precise positional control of bearing assembly 24 about shaft 26.

An application of an external stimuli, such as, for example, an external load J, in the direction of the arrow shown, is applied to bearing carriage 522. Load J is secured to bearing carriage 522 at an outer surface 559 of sidewall 558. It is envisioned that the external stimuli may be applied at various sites about bearing carriage 522. It is further envisioned that multiple loads may be applied. Load J is transmitted through carriage 522 and bearing assembly 24 to shaft 26. Transmission of load J causes an alteration of the load bearing characteristics of assembly 520 and its positional orientation relative to shaft 26.

In response thereto, power source 68 energizes the piezoelectric elements included within piezoelectric stacks 562 providing load compensation through engagement with bearing assembly 24, similar to that discussed above with regard to FIG. 3A. Piezoelectric stacks 562 also facilitate optimum positional orientation by engaging bearing assembly 24 individually or in combination. For example, if load J causes bearing carriage 522 to shift out of proper orientation with shaft 26, individually or combinations of piezoelectric stacks 562 energize to compensate for the shift to achieve proper orientation. It is contemplated that stacks 562 perform sensing measurements, as well as load compensation, similar to that discussed with regard to FIGS. 3C–7.

Alternatively, similar to that discussed with regard to FIG. 3B, prior to the application of load J, piezoelectric stacks 562 may be expanded to preset a preload. Engagement portions 564 of stacks 562 engage bearing assembly 24. Portion 564 engages bearing assembly 24, to properly positionally orient and provide compliance for the anticipated load. The preset preload facilitated by piezoelectric stacks 562 provides a load compensation for a load to achieve optimum deflection characteristics of linear motion bearing assembly 520 improving accuracy of travel of carriage 522 along rail 26.

Figure 20:
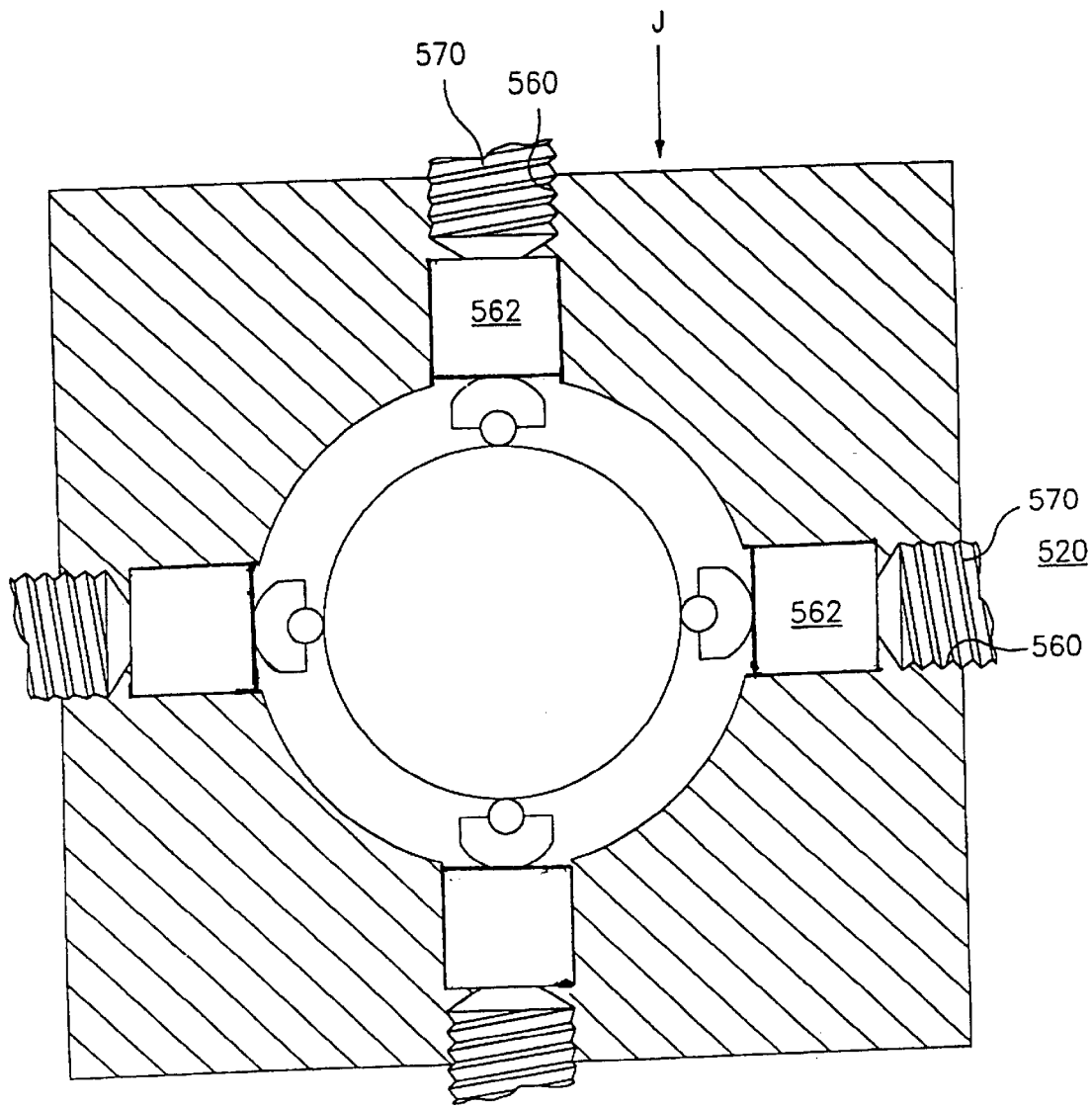
FIG. 20 is an end view, in partial cross-section, of an alternate embodiment of the linear motion bearing assembly shown in FIG. 19.

In another alternate embodiment, as shown in FIG. 20, prior to application of load J to assembly 520, a preset preload is applied by preload structure, such as, for example, set screws 570. Set screws 570 are manipulated to apply a preload on assembly 520 in cooperation with piezoelectric stacks 562, discussed with regard to FIG. 19. Set screws 570 are threadably received within cavities 560 forcing stacks 562 into contact with bearing assembly 24 thereby applying a preload to assembly 20. It is contemplated that stacks 562 may be energized to further facilitate application of a preload to assembly 20. It is further contemplated that set screws 570 may facilitate optimum positional orientation of assembly 20 relative to shaft 26, similar to that discussed above.

Figure 21:
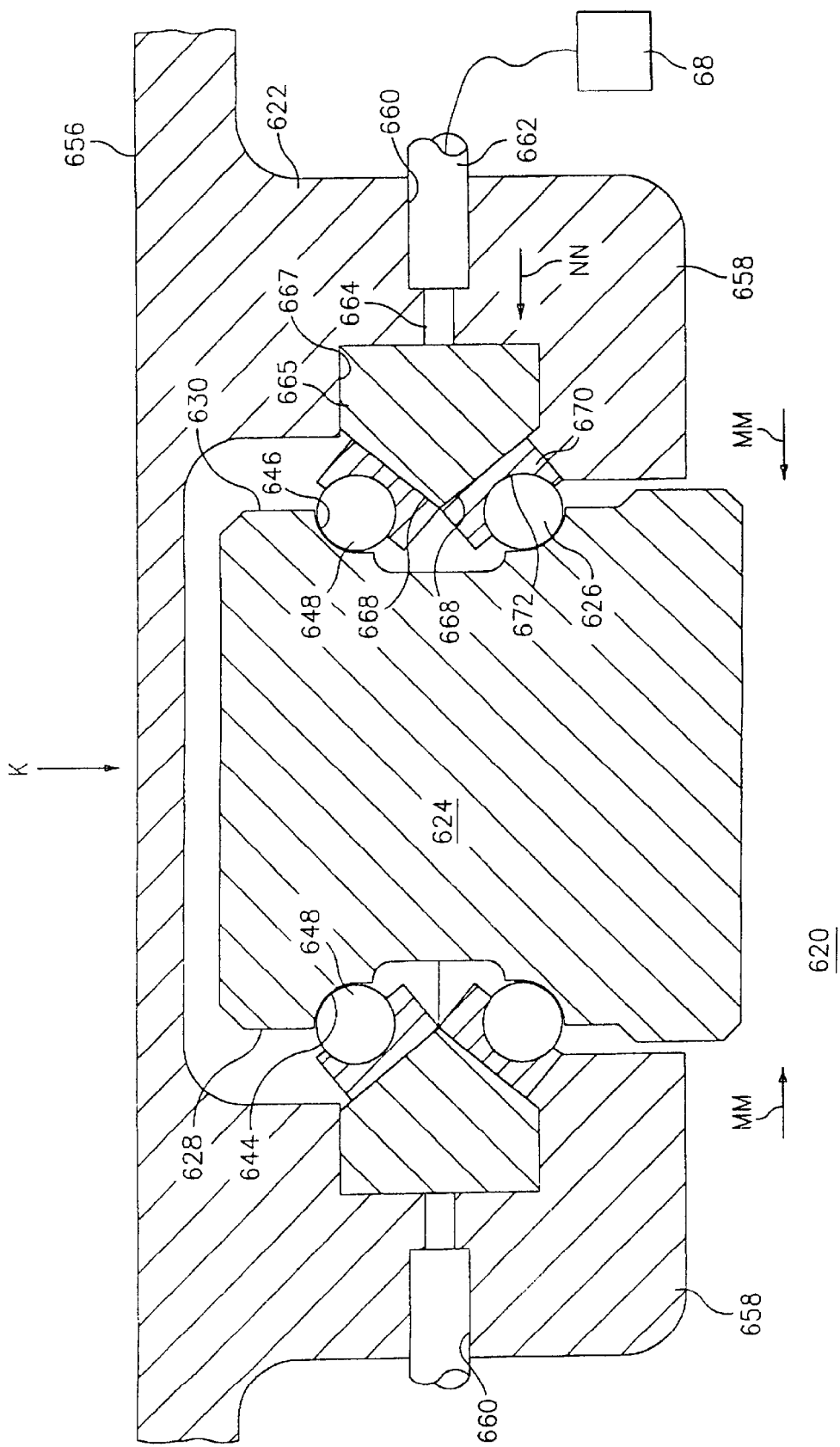
FIG. 21 is an end view, in partial cross-section, of another alternate embodiment of a linear motion bearing assembly in accordance with the present invention.

Referring to FIG. 21, another alternate embodiment of a linear motion bearing assembly, in accordance with the present invention is shown. A linear motion bearing assembly 620 includes an inverted substantially U-shaped bearing carriage 622 configured and dimensioned to move along a rail assembly. The rail assembly includes a rail 624 and rolling elements 626. The deflectable structure includes bearing carriage 622, as will be discussed hereinbelow. Rail 624 has a substantially rectangular configuration with opposing sides 628 and 630 formed along a longitudinal length in an outer surface thereof. It is envisioned that rail 624 may have various configurations, such as, circular, elliptical, etc.

Opposing sides 628 and 630 include outer surfaces, respectively, the outer surfaces each defining a pair of substantially parallel grooves 644 and 646. Grooves 644 form a portion of load bearing tracks 648 corresponding to opposing side 628 of rail 624. Grooves 646 are defined within an outer surface of opposing side 630 and form a portion of load bearing tracks 648 corresponding to opposing side 630. Grooves 644 and 646 are configured and dimensioned in an appropriate cross sectional shape to conform to rolling elements 626 employed in linear motion bearing assembly 620.

Bearing carriage 622 has a bearing carriage portion 656 and a pair of depending legs 658 extending therefrom. Carriage portion 656 of bearing carriage 622 facilitates engagement to desired machinery components.

Bearing carriage 622 includes deflectable structure, such as, for example, a wedge 665. Wedge 665 extends along the longitudinal length of bearing carriage 622 and is disposed within groove 667 formed within the bearing carriage. Wedge 665 is configured for deflection adjacent groove 667 to affect load bearing characteristics of linear motion bearing assembly 620. It is also contemplated that bearing carriage 622 may include a multiple number of wedges having a circular, rectangular, etc., configuration and corresponding to each piezoelectric structure used, discussed below.

Wedge 665 includes a pair of beveled surfaces 668 having machined inserts 670 disposed thereon. It is contemplated that the inserts may be mounted by, such as, for example, an adhesive, mechanical, or welded connection. Machined inserts 670 define grooves 672 which make up a portion of load bearing tracks 648 and are configured and dimensioned in an appropriate cross-sectional shape to conform to rolling elements 626 employed in assembly 620.

Depending legs 658 each define a cavity 660 for receipt of a piezoelectric stack 662 to facilitate load compensation. Piezoelectric stack 662 includes an engagement portion 664 configured to engage wedge 665. Machined inserts 670 are configured for engaging the rail assembly which includes rolling elements 626, to apply a predetermined force from piezoelectric stack 662, to assembly 620, in response to external stimuli. Piezoelectric stack 662 may also provide positional orientation of bearing carriage 622 relative to rail 624.

An application of an external stimuli, such as, for example, an external load K, in the direction of the arrow shown, is applied to bearing carriage 622. Load K is secured to bearing carriage 620 at bearing carriage portion 656. Load K is transmitted through carriage 622, load bearing tracks 648 and rolling elements 626 to rail 624. As downward load K is applied to bearing carriage 622 and load is transmitted to rolling elements 626, depending legs 658 deflect and deform in response thereto.

Depending legs 658 are caused to converge respectively, as shown by arrows MM, as downward load K is applied. Machined inserts 670 engage wedges 665 and correspondingly piezoelectric stack 662 disposed within cavity 660. Transmission of load K causes alteration of the load bearing characteristics of assembly 620 and positional orientation of bearing carriage 622 reactive to rail 624.

In response thereto, power source 68 energizes the piezoelectric elements included in stacks 662 providing load compensation through engagement of engagement portions 664 to wedges 665 and, correspondingly, inserts 670 with the rail assembly, similar to that discussed with regard to FIG. 19. In response to load K and the deflection of legs 658 caused thereby, piezoelectric stack 662 provides load deflection through engagement of wedges 665 and inserts 670 with the rail assembly, as shown by arrow NN, facilitating load compensation for load K on assembly 620. The load compensation provided allows for correct compliance and orientation of legs 658 thereby affecting load bearing characteristics of assembly 620.

Alternatively, prior to the application of load K, piezoelectric stacks 662 can be expanded to preset preload. Engagement portions 664 and thereby, wedges 665 and inserts 670, engage the rail assembly, applying the preset preload, as shown by arrow NN. The preset preload by piezoelectric stack 662 provides a load compensation for a load to achieve optimum deflection characteristics of linear motion bearing assembly 620, improving accuracy of travel of carriage 622 along rail 624.

Figure 22:
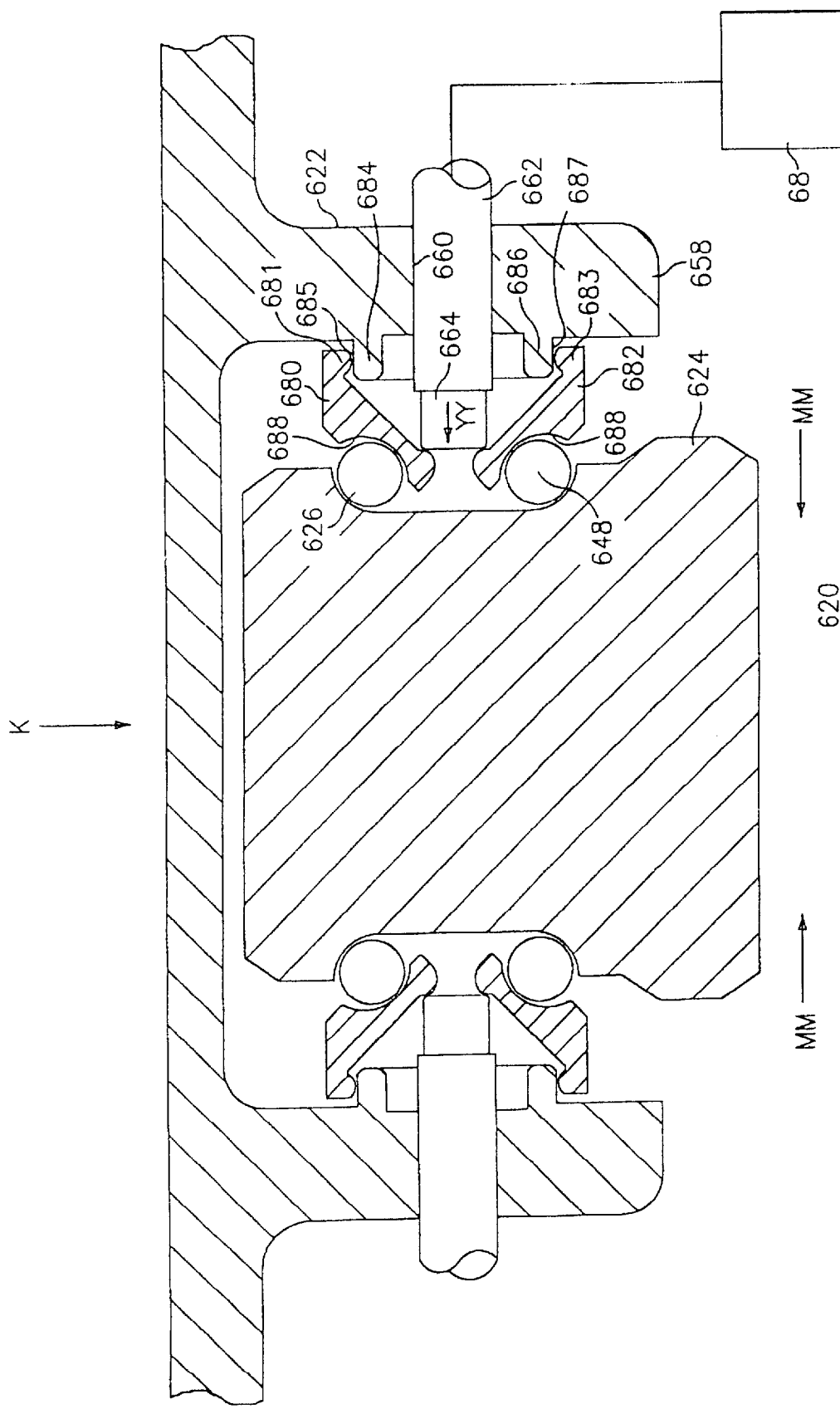
FIG. 22 is an end view, in partial cross-section, of an alternate embodiment of the linear motion bearing assembly shown in FIG. 21.

Referring to FIG. 22, yet another alternate embodiment of linear motion bearing assembly 620, in accordance with the present invention, is shown. The deflectable structure includes bearing carriage 622, as will be discussed hereinbelow.

Bearing carriage 622 includes deflectable structure, such as, for example, upper and lower inserts. Upper inserts 680 and lower inserts 682 each extend along the longitudinal length of bearing carriage 622 and are disposed to engage upper abutments 684 and lower abutments 686, respectively, formed within bearing carriage 622. Inserts 680 and 682 are configured for deflection adjacent the respective abutments to affect load bearing characteristics of linear motion bearing assembly 620. Upper inserts 680 and lower inserts 682 include carriage pivots 681 and 683 for pivotal movement relative to abutments 684 and 686. Carriage pivots 681 and 683 are configured to engage abutments 684 and 686 facilitating load compensation. Carriage pivots 681 and 683 have a radial configuration for engaging the abutments but may also have other designs such as, for example, tetrahedronal, triangular, etc.

Abutments 684 and 686 are formed along a longitudinal length and along an inner surface of depending legs 658. Abutments 684 and 686 include substantially planar faces 685 and 687, respectively, configured to engage carriage pivots 681 and 683, facilitating pivotal movement. It is envisioned that abutments 684 and 686 may have an intermittent configuration extending along carriage 622. It is further envisioned that the faces of the abutments may include protuberances, depressions, etc., configured to retain the inserts in engagement with the abutments. Faces 685 and 687 may include a groove or the like for receiving and retaining carriage pivots 681 and 683 in position and facilitating pivotal movement therein.

Upper inserts 680 and lower inserts 682 each define grooves 688 which make up a portion of load bearing tracks 648 and are configured and dimensioned in an appropriate cross-sectional shape to conform to rolling elements 626 employed in assembly 620.

Depending legs 658 each define a cavity 660 for receipt of a piezoelectric stack 662 to facilitate load compensation. Piezoelectric stack 662 includes an engagement portion 664 configured to engage upper insert 680 and lower insert 682. Upper and lower inserts 680 and 682 are configured for engaging the rail assembly which includes rolling elements 626, to apply a predetermined force from piezoelectric stack 662, to assembly 620, in response to external stimuli. Piezoelectric stack 662 may also provide positional orientation of bearing carriage 622 relative to rail 624.

An application of an external load K, in the direction of the arrow shown, is applied to bearing carriage 622, similar to that described with regard to FIG. 21. Depending legs 658 are caused to diverge respectively, as shown by arrows MM, as downward load K is applied. Inserts 680 and 682 engage piezoelectric stack 662 disposed within cavity 660. Transmission of load K causes alteration of the load bearing characteristics of assembly 620 and positional orientation of bearing carriage 622 relative to rail 624.

In response thereto, power source 68 energizes the piezoelectric elements included within stacks 662 providing load compensation through engagement of engagement portions 664 to inserts 680, 682 with the rail assembly, similar to that discussed with regard to FIG. 19. In response to load K and the deflection of legs 658 caused thereby, piezoelectric stack 662 provides load deflection through engagement of inserts 680, 682 with the rail assembly, as shown by arrow BY, facilitating load compensation for load K on assembly 620. The load compensation provided allows for correct compliance and orientation of legs 658 thereby affecting load bearing characteristics of assembly 620.

Alternatively, prior to the application of load K, piezoelectric stacks 662 can be expanded to preset preload. Engagement portions 664 and inserts 680, 682 engage the rail assembly, applying the preset preload, as shown by arrow BY. The preset preload by piezoelectric stack 662 provides a load compensation for a load to achieve optimum deflection characteristics of linear motion bearing assembly 620, improving accuracy of travel of carriage 622 along rail 624.

Figure 23:
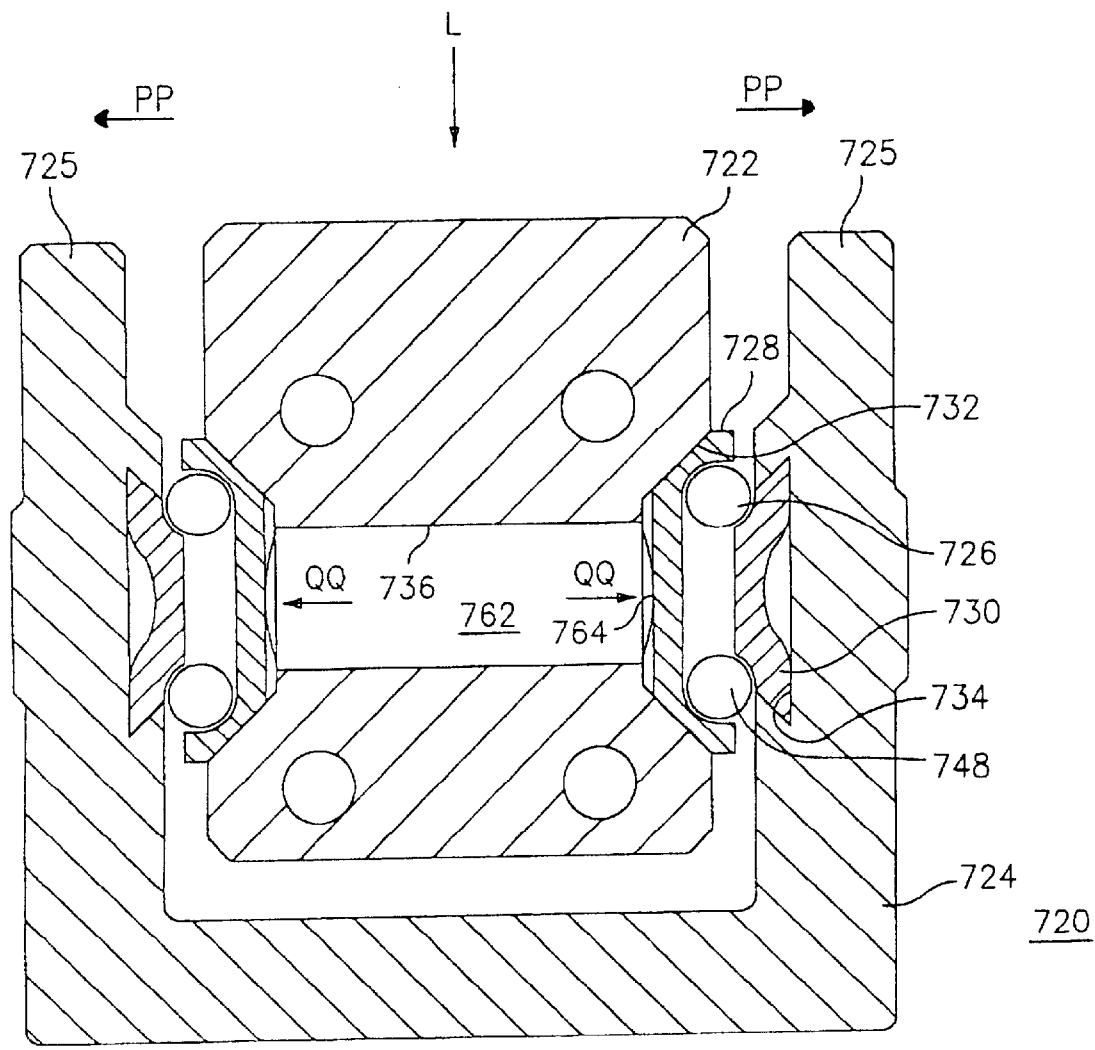
FIG. 23 is an end view, in partial cross-section, of yet another alternate embodiment of a linear motion bearing assembly in accordance with the present invention.

In yet another alternate embodiment, as shown in FIG. 23, a linear motion bearing assembly, in accordance with the present invention is shown. A linear motion bearing assembly 720 includes bearing carriage 722 configured and dimensioned to move along a substantially U-shaped fixed rail 724 on rolling elements 726. Rail 724 includes upwardly extending arms 725.

Bearing carriage 722 includes machined inserts 728 and rail 724 includes machined inserts 730. Inserts 728 are attached to carriage 722 at an outer surface 732 thereof along its longitudinal length. Inserts 730 are attached to rail 724 at an inner surface 734 thereof along its longitudinal length. Inserts 730 are in corresponding orientation to inserts 728 facilitating linear transnational movement of bearing carriage 722 along rail 724 on rolling elements 726. Inserts 728 and 730 define substantially parallel groves which make up portions of load bearing tracks 748 there between. The deflectable structure includes inserts 728 and 730.

A piezoelectric stack 762 is disposed within a cavity 736 of bearing carriage 722. Stack 762 engages inserts 728 and 730 providing load compensation to assembly 720. An application of an external stimuli, such as, for example, an external load L, in the direction of the arrow shown, is applied to bearing carriage 722. Load L is secured to bearing carriage 722 at an upper portion thereof. Load L is transmitted through carriage 722, inserts 728, load bearing tracks 748, rolling elements 726 and inserts 730 to rail 724. As downward load L is applied to bearing carriage 722 and load is transmitted to rallying elements 726, extending arms 725 deflect and deform in response thereto.

Extending arms 725 are caused to diverge, as shown by arrows PP, as downward load L is applied. Inserts 728 are caused to engage engagement positions 764 of piezoelectric stack 762 disposed within cavity 760. Transmission of load L causes alteration of the load bearing characteristics of assembly 720. In response thereto, a power source (not shown) energizes the piezoelectric element included in stack 762 providing load compensation through engagement of inserts 728 with the remainder of assembly 720, similar to that discussed with regard to FIG. 19.

In response to load L and the deflection of arms 725 caused thereby, piezoelectric stack 762 provides load deflection through engagement of inserts 728 with the remainder of the assembly, as shown by arrows QQ, facilitating load compensation for load L on assembly 720. Alternatively, prior to the application of load L, piezoelectric stack 762 can be expanded from engagement portions 764 to preset preload, similar to that discussed above.

Figure 24:
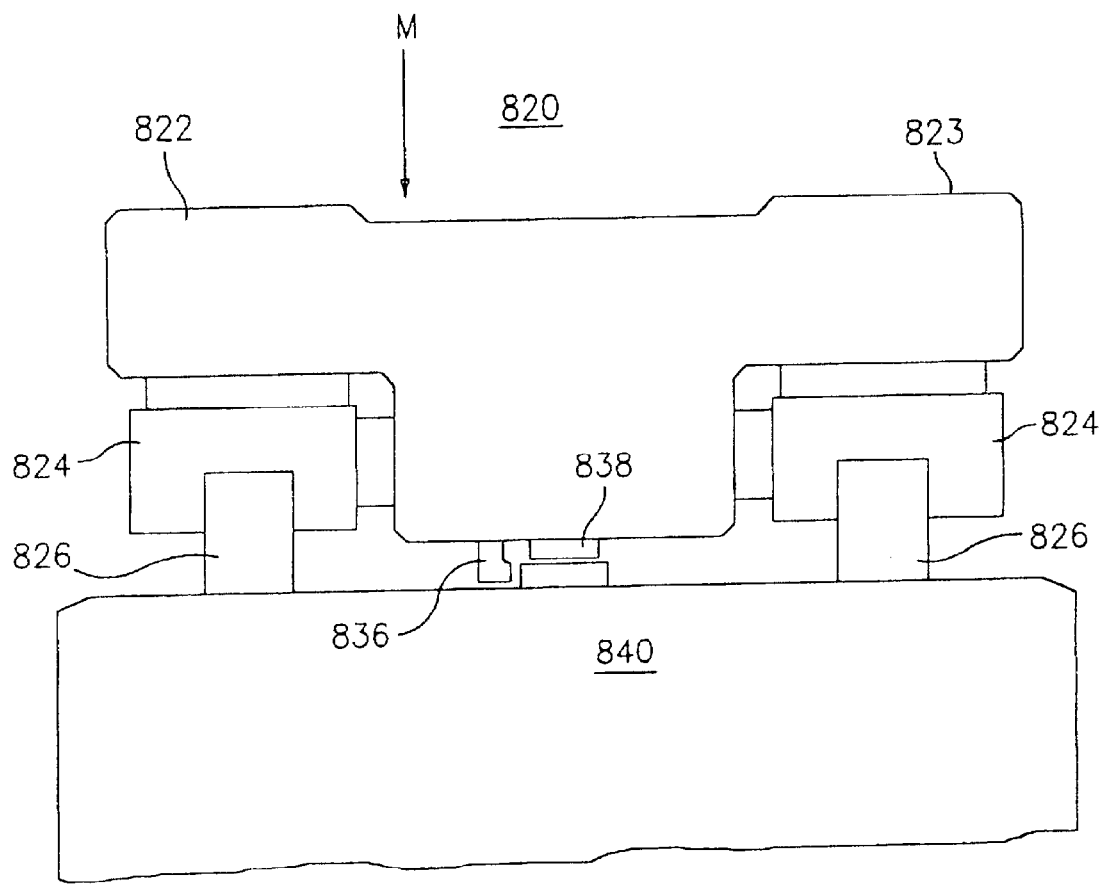
FIG. 24 is an end view of one embodiment of a machine table assembly in accordance with the present invention.

Referring to FIG. 24, a machine table assembly, in accordance with the present invention is shown. A machine table assembly 820 includes a machine table 822 supported by a pair of inverted substantially U-shaped bearing carriages 824 which are configured and dimensioned to move along a pair of rails 826, respectively, on rolling elements (not shown). The deflectable structure includes machine table 822.

Pressure transducer structure is disposed adjacent to and configured for engaging the deflectable structure providing load compensation and optimum positional orientation of machine table 822 relative to bearing carriages 824. The pressure transducer structure applies a predetermined force on the deflectable structure in response to external stimuli.

Figure 25:
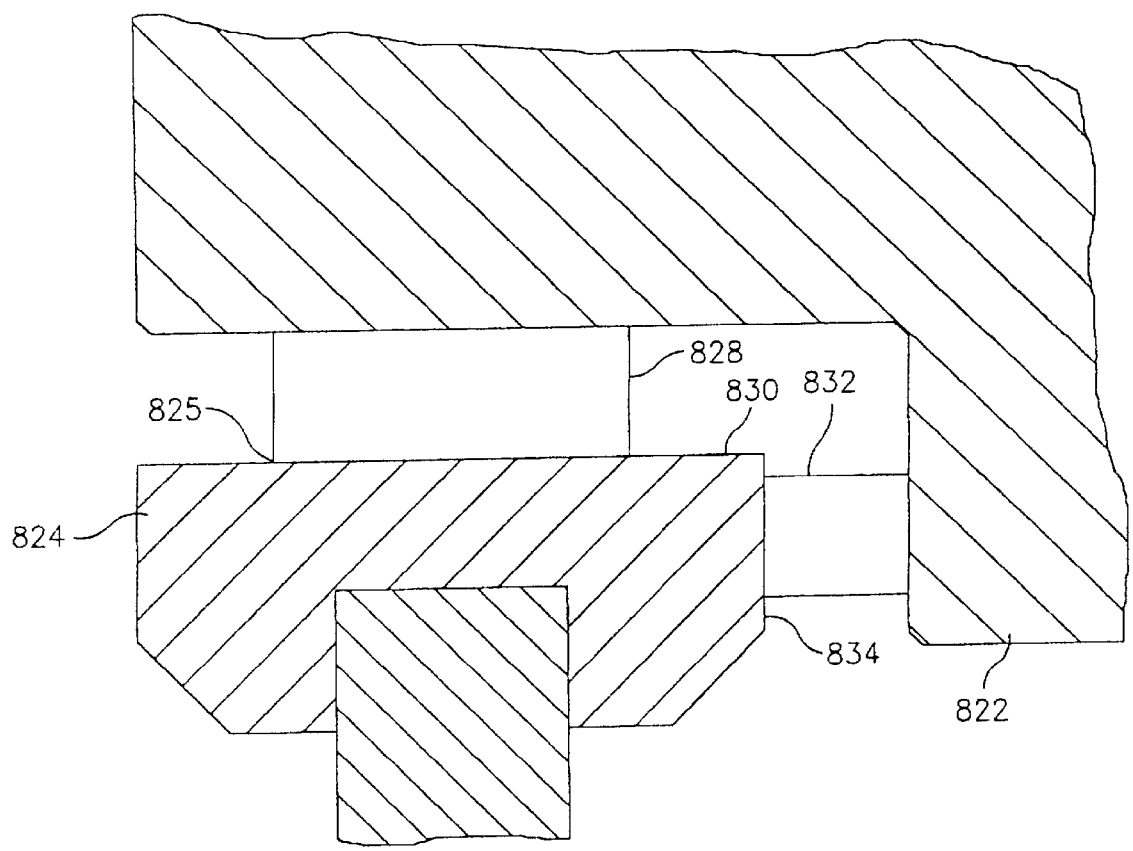
FIG. 25 is an enlarged end view of one embodiment of pressure transducer structure shown in FIG. 24.

Referring to FIG. 25, pressure transducer structure is disposed within cavities 825 defined within carriages 824. A vertical piezoelectric stack 828 is received adjacent to a top portion 830 of carriage 824. A horizontal piezoelectric stack 832 is received adjacent to a side portion 834 of carriage 824. Piezoelectric stacks 828 and 832 are configured for engaging machine table 822 to apply a predetermined force and provide positional orientation of machine table 822 relative to bearing carriages 824, as will be discussed below, in response to an external stimuli. The stacks are expanded and contracted with electric potential, thus, load compensation and positional control may be controlled through an electronic means. The stacks are positioned for engagement with machine table 822 to facilitate precise positional control of the machine table relative to a reference bar, as will be discussed below.

Referring back to FIG. 24, an application of an external stimuli, such as, for example, an external load M, in the direction of the arrow shown, is applied to machine table assembly 820. Load M is secured to an upper portion 823 of machine table 822. Load M is transmitted through machine table 822 and carriages 824 to rails 826. Transmission of load M causes an alteration of the load bearing characteristics of assembly 820 and the positional orientation of table 822 relative to carriages 824.

Assembly 820 performs measurements to provide load compensation in response to load M. Similar to that discussed with regard to FIGS. 3C–7, assembly 820 includes a displacement sensor 836 and a load sensor 838. The measurements taken by the sensors are directly compared to a reference bar 840 using an algorithm for determining load compensation. In response to load M and corresponding sensor measurements, the piezoelectric stacks provide load compensation to assembly 820 to facilitate correct compliance in response to load M.

Piezoelectric stacks 828 and 832 also facilitate optimum positional orientation of machine table 822 relative to the carriages by engaging the table either individually or in combination. For example, if load M causes machine table 822 to shift out of proper orientation, the piezoelectric stacks may be energized individually or in combination, to compensate for the shift to achieve proper orientation. Compensation for a shift by piezoelectric stacks 828 and 832 can be performed using the sensing apparatus discussed above.

The invention in its broader aspects, therefore, is not limited to the specific embodiments herein shown and described but departure may be made therefrom within the scope of the accompanying claims without departing from the principles of the invention and without sacrificing its chief advantages.

What is claimed is:

1. A linear motion bearing assembly including a carriage, a rail, and a bearing assembly, comprising:

deflectable structure formed in at least one of said carriage, rail and bearing assembly, said deflectable structure configured to deflect under a predetermined force to affect load bearing characteristics of said linear motion bearing assembly; and pressure transducer structure disposed adjacent to and configured for engaging said deflectable structure to apply said predetermined force on the deflectable structure in response to external stimuli.

2. The linear motion bearing assembly as recited in claim 1, said deflectable structure including portions of said rail defining a cavity along a longitudinal length of said rail, said pressure transducer structure being disposed within said cavity.

3. The linear motion bearing assembly as recited in claim 2, said portions of said rail including a pair of walls defining said cavity therebetween, said pressure transducer structure being disposed on one of said walls within said cavity and said pressure transducer structure engageable with the remaining wall.

4. The linear motion bearing assembly as recited in claim 3, said portions of said rail comprising horizontal arms, each of said arms defining at least one groove along the longitudinal length of said rail, said groove defining at least a portion of a load bearing track.

5. The linear motion bearing assembly as recited in claim 1, wherein said rail includes a pair of walls defining a cavity therebetween, said deflectable structure comprising one of said walls, said pressure transducer structure being disposed within said cavity.

6. The linear motion bearing assembly as recited in claim 1, said pressure transducer structure comprising piezoelectric structure.

7. The linear motion bearing assembly as recited in claim 6, said piezoelectric structure including at least one piezoelectric chip.

8. The linear motion bearing assembly as recited in claim 6, said piezoelectric structure including two piezoelectric chips, one of said chips configured to sense said external stimuli and a second of said chips configured to apply said predetermined force on said deflectable structure.

9. The linear motion bearing assembly as recited in claim 1, said carriage including a sidewall depending therefrom, said deflectable structure comprising said sidewall.

10. The linear motion bearing assembly as recited in claim 1, said carriage including a pair of depending legs, said deflectable structure comprising at least one of said legs.

11. The linear motion bearing assembly as recited in claim 10, wherein one of said legs define a cavity for receipt of said pressure transducer structure, said pressure transducer structure configured for engaging the remaining depending leg for applying said predetermined force.

12. The linear motion bearing assembly as recited in claim 10, one of said legs defining a cavity, at least a portion of said pressure transducer structure being disposed within said cavity.

13. The linear motion bearing assembly as recited in claim 10, each of said legs including a cavity, said pressure transducer structure being disposed in each cavity.

14. The linear motion bearing assembly as recited in claim 10, said pressure transducer structure comprising piezoelectric structure.

15. The linear motion bearing assembly as recited in claim 14, said piezoelectric structure including at least one piezoelectric chip.

16. The linear motion bearing assembly as recited in claim 14, said piezoelectric structure including two piezoelectric chips, one of said chips configured to sense said external stimuli and a second of said chips configured to apply said predetermined force on deflectable portion.

17. The linear motion bearing assembly as recited in claim 1, said bearing assembly comprising a ball retainer having an outer portion, said outer portion defining at least one load bearing plate aperture therein, said deflectable structure including a load bearing plate being positioned in each of load bearing plate apertures, said pressure transducer structure being disposed on said load bearing plate.

18. The linear motion bearing assembly as recited in claim 17, said carriage including a pair of depending legs, each of said depending legs defining a cavity for receipt of s aid pressure transducer structure disposed therein.

19. The linear motion bearing assembly as recited in claim 17, wherein said carriage defines a plurality of cavities, each of said cavities having pressure transducer structure disposed therein for applying said predetermined force to said deflectable structure.

20. The linear motion bearing assembly as recited in claim 19, wherein each of said cavities are configured to threadably receive preload structure configured to apply at least a portion of said predetermined force to said deflectable structure.

21. A linear motion bearing assembly as recited in claim 17, said pressure transducer structure comprising piezoelectric structure.

22. A linear motion bearing assembly as recited in claim 21, said piezoelectric structure including at least one piezoelectric chip.

23. A linear motion bearing assembly as recited in claim 21, said piezoelectric structure including two piezoelectric chips, one of said chips configured to sense said external stimuli and a second of said chips configured to apply said predetermined force on said deflectable structure.

24. The linear motion bearing assembly as recited in claim 1, said pressure transducer being operated by a computerized numerical controller.

25. The linear motion bearing assembly as recited in claim 1, wherein said carriage defines a groove along a longitudinal length thereof, said deflectable structure being disposed within said groove, said carriage further defining at least one cavity having pressure transducer structure configured to apply said predetermined force to said deflectable structure.

26. The linear motion bearing assembly as recited in claim 25, wherein said deflectable structure includes a longitudinally extending wedge, said wedge having longitudinally extending inserts disposed thereon, said inserts configured to engage said rail.

27. The linear motion bearing assembly as recited in claim 1, wherein said carriage defines abutment structure along a longitudinal length thereof, said deflectable structure including longitudinally extending inserts disposed to engage said abutment structure.

28. The linear motion bearing assembly as recited in claim 1, wherein said carriage has opposing sides, said deflectable structure including at least one load bearing insert being positionable on an opposing side of said carriage and defining a portion of at least one load bearing track between said carriage and said rail, said carriage defining at least one transverse cavity, at least a portion of said pressure transducer structure being disposed within said transverse cavity and being configured and oriented to apply said predetermined force to said deflectable structure.

29. The linear motion bearing assembly as recited in claim 28, wherein said deflectable structure further includes at least one load bearing insert being positionable on an inner surface of said rail and defining a portion of at least one load bearing track between said carriage and said rail.

30. A linear motion bearing assembly including a carriage and a bearing assembly, comprising:

an elongated rail having opposing sides, each of said opposing sides including a pair of horizontal arms, each of said arms having an inner surface and an outer surface, said inner surface defining a cavity between said arms, said outer surface defining a pair of substantially parallel grooves, said grooves defining a portion of load bearing tracks, said arms being configured to deflect under a predetermined force to affect load bearing characteristics of said linear motion bearing assembly; and a plurality of piezoelectric chips disposed within each of said cavities and configured for engaging said respective inner surfaces to apply said predetermined force on said arms in response to external stimuli.

31. A machine table assembly including a machine table supported by a pair of linear motion bearing assemblies, the machine table assembly comprising;

deflectable structure including at least a portion of the machine table, said deflectable structure configured to deflect under a predetermined force to affect load bearing characteristics of said machine table assembly; and pressure transducer structure disposed on at least one of said linear motion bearing assemblies, said pressure transducer structure disposed adjacent to and configured for engaging said deflectable structure to apply said predetermined force on the deflectable structure in response to external stimuli.

32. The machine table assembly as recited in claim 31, wherein each of said linear motion bearing assemblies includes a carriage having a top portion and a side portion, said pressure transducer structure includes a vertical piezoelectric stack disposed within a cavity defined within said top portion and a horizontal stack disposed within a cavity defined within said side portion.

33. The machine table assembly as recited in claim 31, said machine table assembly further comprising a displacement sensor and a load sensor, said sensors configured to cooperate with a reference bar to orient said machine table relative to said linear motion bearing assemblies.

* * * * *